United States Patent
Nagai

(10) Patent No.: US 12,321,629 B2
(45) Date of Patent: Jun. 3, 2025

(54) MEMORY SYSTEM AND CONTROL METHOD

(71) Applicant: Kioxia Corporation, Tokyo (JP)

(72) Inventor: Koichi Nagai, Tokyo (JP)

(73) Assignee: Kioxia Corporation, Tokyo (JP)

( * ) Notice: Subject to any disclaimer, the term of this patent is extended or adjusted under 35 U.S.C. 154(b) by 92 days.

(21) Appl. No.: 18/155,919

(22) Filed: Jan. 18, 2023

(65) Prior Publication Data

US 2023/0153012 A1 May 18, 2023

Related U.S. Application Data

(63) Continuation of application No. 17/185,493, filed on Feb. 25, 2021, now Pat. No. 11,586,377.

(30) Foreign Application Priority Data

Jun. 26, 2020 (JP) ................. 2020-110307

(51) Int. Cl.
G06F 3/06 (2006.01)
G06F 12/10 (2016.01)
G06F 21/60 (2013.01)

(52) U.S. Cl.
CPC ............ *G06F 3/0652* (2013.01); *G06F 3/062* (2013.01); *G06F 3/0679* (2013.01); *G06F 12/10* (2013.01);
(Continued)

(58) Field of Classification Search
CPC ...... G06F 3/0652; G06F 3/0623; G06F 3/062; G06F 3/0679; G06F 12/0253;
(Continued)

(56) References Cited

U.S. PATENT DOCUMENTS 8,495,292 B2 7/2013 Flynn
10,353,612 B2 7/2019 Kanno
(Continued)

FOREIGN PATENT DOCUMENTS

CN 106575271 A 4/2017
CN 108509145 A 9/2018
(Continued)

OTHER PUBLICATIONS

Taiwan Office Action dated Feb. 15, 2022, mailed in counterpart Taiwan Application No. 110104618, 10 pages (with translation).
(Continued)

*Primary Examiner* — Curtis James Kortman
(74) *Attorney, Agent, or Firm* — Kim & Stewart LLP

(57) ABSTRACT

According to one embodiment, a memory system includes a non-volatile memory with a plurality of blocks. The minimum unit of a data erasing operation in the memory system is a block. A controller is electrically connected to the non-volatile memory and configured to execute, in response to a first command from a host requesting a secure erase of secure erase target data stored in a first logical area identified by a first logical area identifier, a copy operation copying valid data other than any secure erase target data from one or more first blocks of the plurality in which the secure erase target data is stored to one or more copy destination blocks of the plurality. The controller executes the data erasing operation on the one or more first blocks after the copy operation.

14 Claims, 22 Drawing Sheets

(52) U.S. Cl.
CPC ...... *G06F 21/60* (2013.01); *G06F 2212/1052* (2013.01); *G06F 2221/2143* (2013.01)

(58) Field of Classification Search
CPC .. G06F 12/10; G06F 12/0246; G06F 12/1027; G06F 12/0408; G06F 2212/7205; G06F 2212/1052; G06F 2212/7201; G06F 2212/7204; G06F 2212/7209; G06F 2221/2143; G06F 21/60
See application file for complete search history.

(56) References Cited

U.S. PATENT DOCUMENTS

| | | | |
|---|---|---|---|
| 10,387,328 B2 | 8/2019 | Flynn | |
| 10,403,369 B2 | 9/2019 | Lin | |
| 10,411,024 B2 | 9/2019 | Kanno | |
| 11,042,478 B2 | 6/2021 | Sabol | |
| 11,188,237 B2 | 11/2021 | Tran | |
| 11,586,377 B2* | 2/2023 | Nagai | G06F 3/062 |
| 2012/0278564 A1* | 11/2012 | Goss | G06F 12/00 711/155 |
| 2013/0185555 A1 | 7/2013 | Wang | |
| 2014/0006689 A1 | 1/2014 | Hashimoto | |
| 2016/0246529 A1* | 8/2016 | Kim | G11C 16/16 |
| 2016/0274800 A1 | 9/2016 | Earhart | |
| 2018/0121344 A1* | 5/2018 | Seo | G06F 12/0246 |
| 2019/0004964 A1 | 1/2019 | Kanno | |
| 2019/0036704 A1 | 1/2019 | DeVetter | |
| 2019/0114097 A1 | 4/2019 | Tran | |
| 2019/0317688 A1* | 10/2019 | Cheon | G06F 3/0608 |
| 2019/0335062 A1 | 10/2019 | Sou | |
| 2019/0391928 A1 | 12/2019 | Lin | |
| 2020/0027512 A1* | 1/2020 | Yun | G11C 16/14 |
| 2021/0073120 A1* | 3/2021 | McVay | G06F 3/0652 |

FOREIGN PATENT DOCUMENTS

| | | |
|---|---|---|
| JP | 2013196164 A | 9/2013 |
| JP | 2019008730 A | 1/2019 |
| JP | 2019191910 A | 10/2019 |
| TW | 201923771 A | 6/2019 |

OTHER PUBLICATIONS

Chinese Office Action dated Nov. 12, 2024, mailed in counterpart Chinese Application No. 202110259414.6, 26 pages (with translation).

* cited by examiner

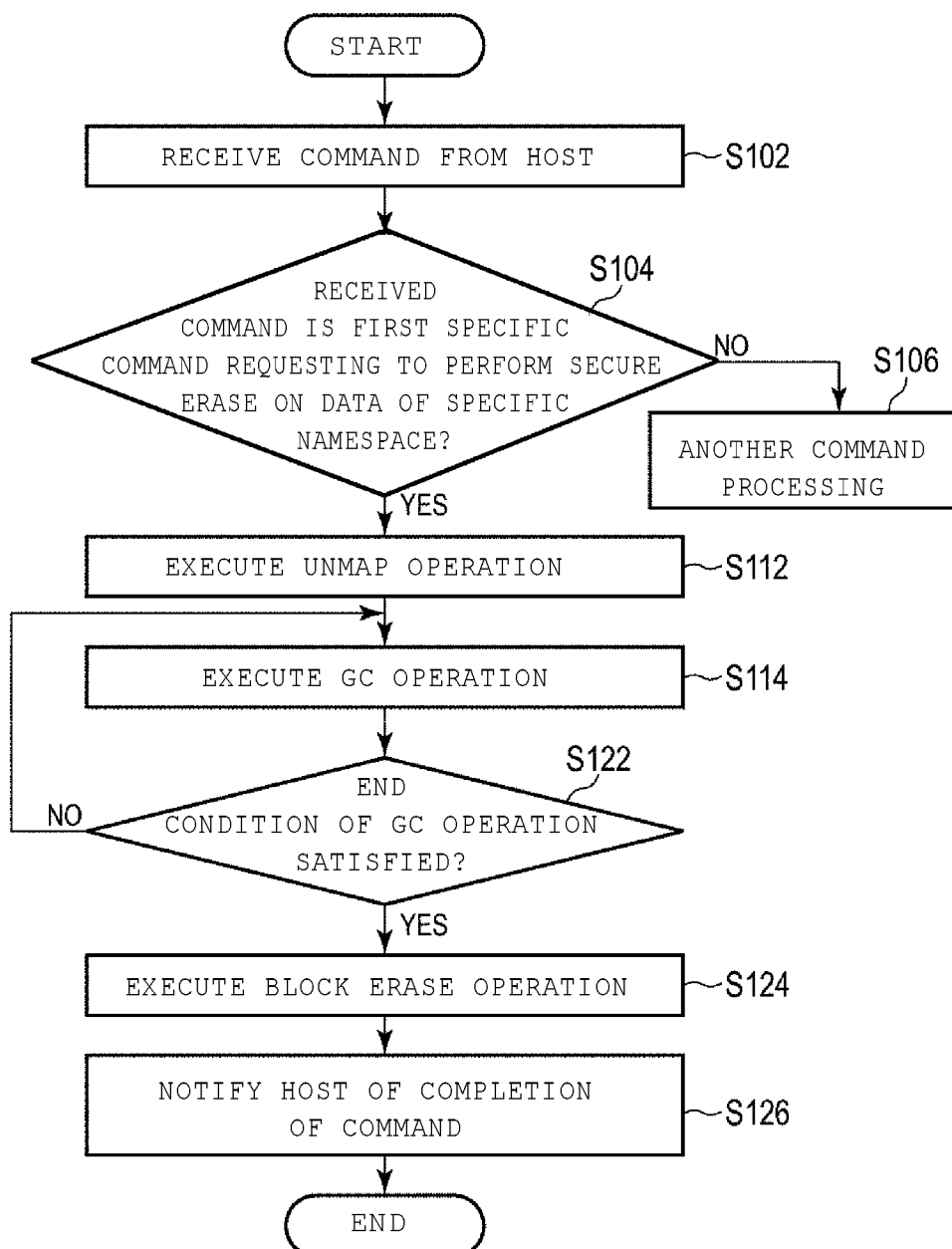

FIG. 6A

| PAGE P0 | NSID, LBA | DATA CORRESPONDING TO NSID AND LBA | ... | NSID, LBA | DATA CORRESPONDING TO NSID AND LBA |
|---|---|---|---|---|---|
| PAGE P1 | NSID, LBA | DATA CORRESPONDING TO NSID AND LBA | ... | NSID, LBA | DATA CORRESPONDING TO NSID AND LBA |
| ... | ... | ... | ... | ... | ... |
| PAGE Py-1 | NSID, LBA | DATA CORRESPONDING TO NSID AND LBA | ... | NSID, LBA | DATA CORRESPONDING TO NSID AND LBA |

FIG. 6B

| PAGE P0 | NSID, LBA | DATA CORRESPONDING TO NSID AND LBA | ... | NSID, LBA | DATA CORRESPONDING TO NSID AND LBA |
|---|---|---|---|---|---|
| PAGE P1 | NSID, LBA | DATA CORRESPONDING TO NSID AND LBA | ... | NSID, LBA | DATA CORRESPONDING TO NSID AND LBA |
| ... | ... | ... | ... | ... | ... |
| PAGE Py-1 | NSID, LBA | DATA CORRESPONDING TO NSID AND LBA | ... | LIST OF NSID | |

FIG. 9A

BLOCK BLK0 (ACTIVE BLOCK IN MIDDLE OF WRITE)

| C: VALID DATA | A: INVALID DATA | A: VALID DATA | B: INVALID DATA |
|---|---|---|---|
| A: VALID DATA | C: VALID DATA | A: VALID DATA | B: VALID DATA |
| B: VALID DATA | A: INVALID DATA | C: VALID DATA | |
| | | | |
| | | | |

BLOCK BLK1 (COMPLETELY WRITTEN ACTIVE BLOCK)

| A: VALID DATA | A: VALID DATA | A: VALID DATA | A: INVALID DATA |
|---|---|---|---|
| B: VALID DATA | C: VALID DATA | B: INVALID DATA | B: VALID DATA |
| C: VALID DATA | A: INVALID DATA | C: VALID DATA | A: VALID DATA |
| A: INVALID DATA | B: INVALID DATA | A: VALID DATA | B: VALID DATA |
| B: VALID DATA | A: VALID DATA | A: INVALID DATA | C: VALID DATA |

BLOCK BLK2 (COMPLETELY WRITTEN ACTIVE BLOCK)

| A: INVALID DATA | A: VALID DATA | A: VALID DATA | B: VALID DATA |
|---|---|---|---|
| A: INVALID DATA | A: INVALID DATA | B: INVALID DATA | B: VALID DATA |
| B: INVALID DATA | A: VALID DATA | A: VALID DATA | A: VALID DATA |
| A: VALID DATA | B: INVALID DATA | A: VALID DATA | B: VALID DATA |
| B: VALID DATA | A: VALID DATA | A: VALID DATA | A: VALID DATA |

FIG. 9B

BLOCK BLK3 (FREE BLOCK)

| A: INVALID DATA | A: INVALID DATA | A: INVALID DATA | C: INVALID DATA |
|---|---|---|---|
| A: INVALID DATA | A: INVALID DATA | C: INVALID DATA | A: INVALID DATA |
| A: INVALID DATA | A: INVALID DATA | A: INVALID DATA | C: INVALID DATA |
| C: INVALID DATA | A: INVALID DATA | A: INVALID DATA | C: INVALID DATA |
| A: INVALID DATA | C: INVALID DATA | A: INVALID DATA | A: INVALID DATA |

BLOCK BLK4 (FREE BLOCK)

| B: INVALID DATA | B: INVALID DATA | A: INVALID DATA | C: INVALID DATA |
|---|---|---|---|
| A: INVALID DATA | A: INVALID DATA | C: INVALID DATA | A: INVALID DATA |
| A: INVALID DATA | A: INVALID DATA | A: INVALID DATA | C: INVALID DATA |
| C: INVALID DATA | A: INVALID DATA | A: INVALID DATA | C: INVALID DATA |
| A: INVALID DATA | C: INVALID DATA | A: INVALID DATA | A: INVALID DATA |

BLOCK BLK5 (FREE BLOCK)

| C: INVALID DATA | A: INVALID DATA | B: INVALID DATA | B: INVALID DATA |
|---|---|---|---|
| C: INVALID DATA | C: INVALID DATA | B: INVALID DATA | B: INVALID DATA |
| A: INVALID DATA | C: INVALID DATA | B: INVALID DATA | B: INVALID DATA |
| B: INVALID DATA | A: INVALID DATA | A: INVALID DATA | B: INVALID DATA |
| A: INVALID DATA | C: INVALID DATA | B: INVALID DATA | B: INVALID DATA |

BLOCK BLK6 (FREE BLOCK)

| B: INVALID DATA | C: INVALID DATA | B: INVALID DATA | C: INVALID DATA |
|---|---|---|---|
| A: INVALID DATA | B: INVALID DATA | B: INVALID DATA | C: INVALID DATA |
| A: INVALID DATA | B: INVALID DATA | C: INVALID DATA | C: INVALID DATA |
| C: INVALID DATA | A: INVALID DATA | A: INVALID DATA | B: INVALID DATA |
| C: INVALID DATA | C: INVALID DATA | B: INVALID DATA | A: INVALID DATA |

FIG. 10

BLOCK BLK0 (ACTIVE BLOCK IN MIDDLE OF WRITE)

| C: VALID DATA | A: INVALID DATA | A: VALID DATA | B: INVALID DATA |
|---|---|---|---|
| A: VALID DATA | C: VALID DATA | A: VALID DATA | B: INVALID DATA |
| B: INVALID DATA | A: INVALID DATA | C: VALID DATA | |
| | | | |
| | | | |

BLOCK BLK1 (COMPLETELY WRITTEN ACTIVE BLOCK)

| A: VALID DATA | A: VALID DATA | A: VALID DATA | A: INVALID DATA |
|---|---|---|---|
| B: INVALID DATA | C: VALID DATA | B: INVALID DATA | B: INVALID DATA |
| C: VALID DATA | A: INVALID DATA | C: VALID DATA | A: VALID DATA |
| A: INVALID DATA | B: INVALID DATA | A: VALID DATA | B: INVALID DATA |
| B: INVALID DATA | A: VALID DATA | A: INVALID DATA | C: VALID DATA |

BLOCK BLK2 (COMPLETELY WRITTEN ACTIVE BLOCK)

| A: INVALID DATA | A: VALID DATA | A: VALID DATA | B: INVALID DATA |
|---|---|---|---|
| A: INVALID DATA | A: INVALID DATA | B: INVALID DATA | B: INVALID DATA |
| B: INVALID DATA | A: VALID DATA | A: VALID DATA | A: VALID DATA |
| A: VALID DATA | B: INVALID DATA | A: VALID DATA | B: INVALID DATA |
| B: INVALID DATA | A: VALID DATA | A: VALID DATA | A: VALID DATA |

FIG. 11A

BLOCK BLK6 (COMPLETELY WRITTEN ACTIVE BLOCK)
(BLOCK ERASE FREE BLOCK BLK6 AND RECORD VALID DATA OF BLOCKS BLK1 AND BLK2)

| A: VALID DATA(B) | A: VALID DATA(C) | A: VALID DATA(B) | C: VALID DATA(C) |
|---|---|---|---|
| C: VALID DATA(A) | C: VALID DATA(B) | A: VALID DATA(B) | A: VALID DATA(C) |
| A: VALID DATA(A) | C: VALID DATA(B) | A: VALID DATA(C) | A: VALID DATA(C) |
| A: VALID DATA(C) | A: VALID DATA(A) | A: VALID DATA(A) | A: VALID DATA(B) |
| A: VALID DATA(C) | A: VALID DATA(C) | A: VALID DATA(B) | A: VALID DATA(A) |

BLOCK BLK5 (ACTIVE BLOCK IN MIDDLE OF WRITE)
(BLOCK ERASE FREE BLOCK BLK5 AND RECORD VALID DATA OF BLOCK BLK0)

| C: VALID DATA(C) | A: VALID DATA(A) | A: VALID DATA(B) | C: VALID DATA(B) |
|---|---|---|---|
| A: VALID DATA(C) | C: VALID DATA(C) | (B) | (B) |
| (A) | (C) | (B) | (B) |
| (B) | (A) | (A) | (B) |
| (A) | (C) | (B) | (B) |

FIG. 11B

BLOCK BLK0 (FREE BLOCK) (BLOCK ERASE IS PERFORMED)

| C: INVALID DATA | A: INVALID DATA | A: INVALID DATA | B: INVALID DATA |
|---|---|---|---|
| A: INVALID DATA | C: INVALID DATA | A: INVALID DATA | B: INVALID DATA |
| B: INVALID DATA | A: INVALID DATA | C: INVALID DATA | |
| | | | |

BLOCK BLK1 (FREE BLOCK) (BLOCK ERASE IS PERFORMED)

| A: INVALID DATA | A: INVALID DATA | A: INVALID DATA | A: INVALID DATA |
|---|---|---|---|
| B: INVALID DATA | C: INVALID DATA | B: INVALID DATA | B: INVALID DATA |
| C: INVALID DATA | A: INVALID DATA | C: INVALID DATA | A: INVALID DATA |
| A: INVALID DATA | B: INVALID DATA | A: INVALID DATA | B: INVALID DATA |
| B: INVALID DATA | A: INVALID DATA | A: INVALID DATA | C: INVALID DATA |

BLOCK BLK2 (FREE BLOCK) (BLOCK ERASE IS PERFORMED)

| A: INVALID DATA | A: INVALID DATA | A: INVALID DATA | B: INVALID DATA |
|---|---|---|---|
| A: INVALID DATA | A: INVALID DATA | B: INVALID DATA | B: INVALID DATA |
| B: INVALID DATA | A: INVALID DATA | A: INVALID DATA | A: INVALID DATA |
| A: INVALID DATA | B: INVALID DATA | A: INVALID DATA | B: INVALID DATA |
| B: INVALID DATA | A: INVALID DATA | A: INVALID DATA | A: INVALID DATA |

BLOCK BLK3 (FREE BLOCK) (BLOCK ERASE IS NOT PERFORMED BECAUSE DATA IN NAMESPACE B IS NOT STORED

| A: INVALID DATA | A: INVALID DATA | A: INVALID DATA | C: INVALID DATA |
|---|---|---|---|
| A: INVALID DATA | A: INVALID DATA | C: INVALID DATA | A: INVALID DATA |
| A: INVALID DATA | A: INVALID DATA | A: INVALID DATA | C: INVALID DATA |
| C: INVALID DATA | A: INVALID DATA | A: INVALID DATA | C: INVALID DATA |
| A: INVALID DATA | C: INVALID DATA | A: INVALID DATA | A: INVALID DATA |

BLOCK BLK3 (FREE BLOCK) (BLOCK ERASE IS PERFORMED BECAUSE DATA IN NAMESPACE B IS STORED)

| B: INVALID DATA | B: INVALID DATA | A: INVALID DATA | C: INVALID DATA |
|---|---|---|---|
| A: INVALID DATA | A: INVALID DATA | C: INVALID DATA | A: INVALID DATA |
| A: INVALID DATA | A: INVALID DATA | A: INVALID DATA | C: INVALID DATA |
| C: INVALID DATA | A: INVALID DATA | A: INVALID DATA | C: INVALID DATA |
| A: INVALID DATA | C: INVALID DATA | A: INVALID DATA | A: INVALID DATA |

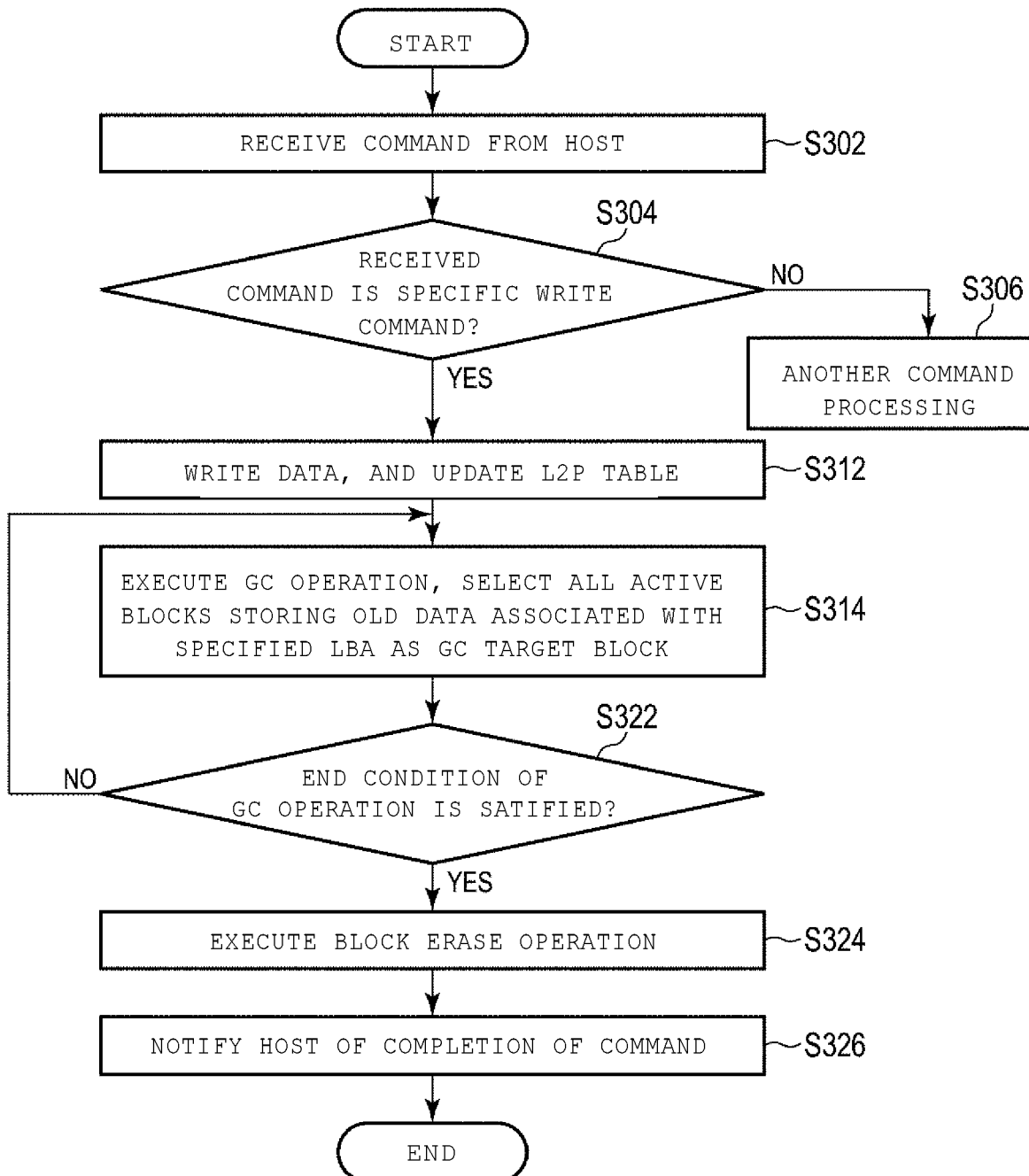

MEMORY SYSTEM AND CONTROL METHOD

CROSS-REFERENCE TO RELATED APPLICATIONS

This application is a continuation of U.S. patent application Ser. No. 17/185,493, filed on Feb. 25, 2021, which is based upon and claims the benefit of priority from Japanese Patent Application No. 2020-110307, filed on Jun. 26, 2020, the entire contents of each of which are incorporated herein by reference.

FIELD

Embodiments described herein relate generally to memory systems and a technique of controlling a non-volatile memory of a memory system.

BACKGROUND

In recent years, memory systems having a non-volatile memory have become widespread. As one such memory system, a solid-state drive (SSD) having a NAND type flash memory is known.

Overwrite, block erase, and cryptographic erase are known as secure erase methods of safely and surely erasing data stored in an SSD. The secure erase methods are classified into a physical secure erase method that is an erase method of making stored data physically and irreversibly unreadable and a logical secure erase method that is an erase method of making stored data logically unreadable. Each of overwrite and block erase is an example of the physical secure erase method. Cryptographic erase is an example of the logical secure erase method.

In cryptographic erase, an encryption key used when data stored in an SSD is encrypted is erased by the physical secure erase method. Thereby, the stored data is no longer able to be decrypted, and can be said to be logically erased.

Recently, there has been a demand to perform secure erase on specific data among all the data stored in a memory system, such as an SSD, by a physical secure erase method.

BRIEF DESCRIPTION OF THE DRAWINGS

FIG. 5 is a flowchart illustrating a procedure of a physical secure erase operation executed in a memory system according to a first embodiment.

FIGS. 6A and 6B are diagrams illustrating examples of a data structure written in each block.

FIG. 9A is a diagram illustrating an example of the content of each active block before the start of a physical secure erase operation.

FIG. 9B is a diagram illustrating an example of the content of each free block before the start of a physical secure erase operation.

FIG. 10 is a diagram illustrating an example of the content of each active block after an unmap operation has been executed.

FIG. 11A is a diagram illustrating an example of the content of each active block after a garbage collection operation has been executed.

FIG. 11B is a diagram illustrating an example of the content of each free block after a garbage collection operation has been executed.

FIG. 15 is a flowchart illustrating a procedure of a physical secure erase operation according to a fifth embodiment.

DETAILED DESCRIPTION

Embodiments provide a memory system and a control method which are capable of performing secure erase on just specific data amongst all stored data by a physical secure erase method.

In general, according to one embodiment, a memory system comprises a non-volatile memory having a plurality of blocks. The minimum unit for a data erasing operation is a block. A controller in the memory system is electrically connected to the non-volatile memory. The controller is configured to execute, in response to a first command from a host requesting a secure erase of secure erase target data stored in a first logical area identified by a first logical area identifier, a copy operation copying valid data other than any secure erase target data from one or more first blocks of the plurality in which the secure erase target data is stored to one or more copy destination blocks of the plurality. The controller is also configured to execute the data erasing operation on the one or more first blocks after the copy operation.

Hereinafter, certain example embodiments will be described with reference to the drawings.

First Embodiment

Figure 1:
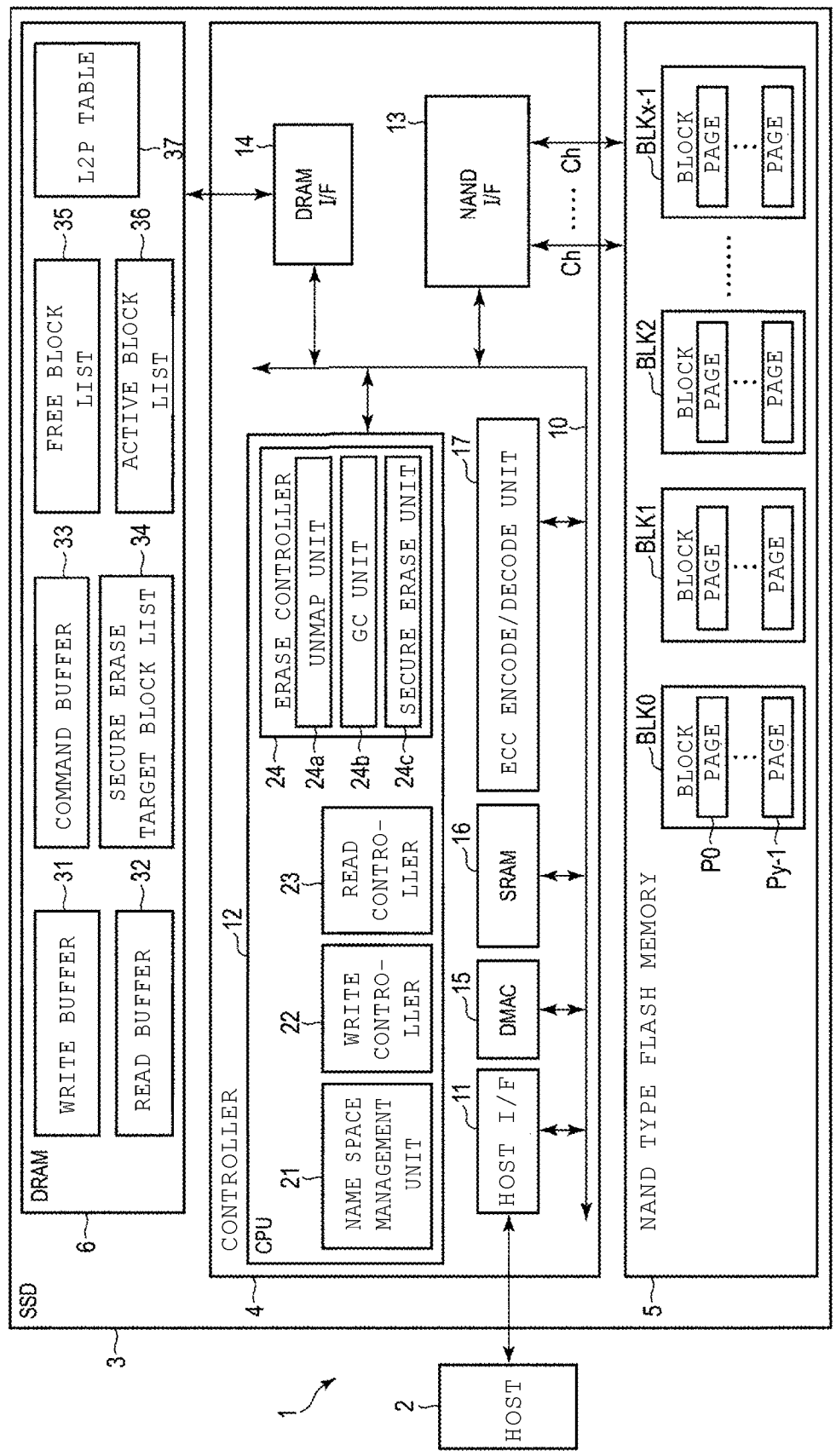
FIG. 1 is a block diagram of an information processing system including a memory system according to a first embodiment.

A configuration of an information processing system including a memory system according to a first embodiment will be described. FIG. 1 is a block diagram illustrating a configuration example of the information processing system 1 including a memory system according to the first embodiment. The memory system in this example is a semiconductor storage device configured to write data to a non-volatile memory and read data from the non-volatile memory. The memory system is implemented as, for example, an SSD 3 including a NAND type flash memory.

The information processing system 1 includes a host 2 (host device) and the SSD 3. The host 2 is an information processing device configured to control the SSD 3. Possible examples of the host 2 include a personal computer, a server computer, a mobile terminal, and an in-vehicle device.

The SSD 3 may be connected to the host 2 via a cable or a network. Alternatively, the SSD 3 may be built or mounted within the host 2.

An interface for connecting the host 2 and the SSD 3 may use serial ATA (SATA), serial attached SCSI (SAS), universal flash storage (UFS), PCI Express (PCIe)®, or Ethernet®, but are not limited to this.

The SSD 3 includes a controller 4 and a non-volatile memory (e.g., a NAND type flash memory 5). The SSD 3 may also have a random access memory, for example, a dynamic random access memory (DRAM) 6.

The NAND type flash memory 5 includes a memory cell array having a plurality of memory cells arranged in a matrix. The NAND type flash memory 5 may be a flash memory of two-dimensional structure type or a flash memory of a three-dimensional structure type.

The memory cell array of the NAND type flash memory 5 includes a plurality of blocks BLK0 to BLKx−1. Each of the blocks BLK0 to BLKx−1 contains a plurality of pages (here, pages P0 to Py−1). Each page contains a plurality of memory cells connected to the same word line. The individual blocks BLK0 to BLKx−1 are the unit size for a data erasing operation (hereinafter, also referred to as block erase) for erasing data from the NAND type flash memory 5. The blocks in this context are also referred to as "erasing blocks", "physical blocks", or "physical erasing blocks". The pages P0 to Py−1 are the unit size for a data write operation and a data read operation.

The controller 4 may be implemented by a circuit such as a system-on-a-chip (SoC). The controller 4 is electrically connected to the NAND type flash memory 5 via a NAND interface 13 which is compliant with a toggle NAND flash interface or an open NAND flash interface (ONFI), but is not limited to this. The controller 4 operates as a memory controller configured to control the NAND type flash memory 5.

The controller 4 may function as a flash translation layer (FTL) configured to execute data management and block management of the NAND type flash memory 5.

The data management executed by the FTL includes (1) management of mapping information indicating a correspondence between each logical area identifier and each physical address of the NAND type flash memory 5 and (2) processing for concealing restrictions of the NAND type flash memory 5 (e.g., a page-based read/write operation and a block-based erasing operation).

The logical area identifier may be a namespace identifier, a logical address, or a combination of the namespace identifier and the logical address.

In this context, a logical address is used by the host 2 to specify an address in a logical address space of the SSD 3. As the logical address, a logical block address (addressing) (LBA) or a key of a key-value store may be used.

The controller 4 is configured to create and manage a plurality of namespaces. The plurality of namespaces are logical address ranges independent of each other. The plurality of namespaces are used to make one storage device behave as if the device were a plurality of separate/distinct storage devices. The plurality of namespaces are used by the host 2 to access the SSD 3. The namespace identifier is used by the host 2 to specify a namespace.

The management of mapping between each logical area identifier used by the host 2 to access the SSD 3 and each physical address (physical block address) PBA of the NAND type flash memory 5 is executed by using an address conversion table referred to as a logical-to-physical address translation table (L2P table) 37. The logical area identifier in the L2P table includes a logical address. The controller 4 uses the L2P table 37 to manage the mapping between each logical area identifier and each physical address. A physical address corresponding to a certain logical area identifier indicates the physical storage position in the NAND type flash memory 5 where data corresponding to this logical area identifier has been most recently written. The L2P table 37 may be loaded from the NAND type flash memory 5 into the DRAM 6 when the power of the SSD 3 is turned on (startup).

When an LBA is used as the logical area identifier, the L2P table 37 manages a mapping between each LBA and each physical address PBA with a predetermined management size called a cluster. When the size of a sector specified by the LBA is smaller than the size of the cluster, bitmap data indicating whether data of each sector in each cluster is valid data or invalid data may also be stored in the L2P table 37.

When the key of the key-value store is used as the logical area identifier, the L2P table 37 may manage a correspondence between, for example, a hash value of each key, a pointer to each key, the unique number corresponding to each key, the size of a value corresponding to each key, and a physical address list including one or more physical addresses in which the value corresponding to each key is stored, but is not limited to this.

Figure 2:
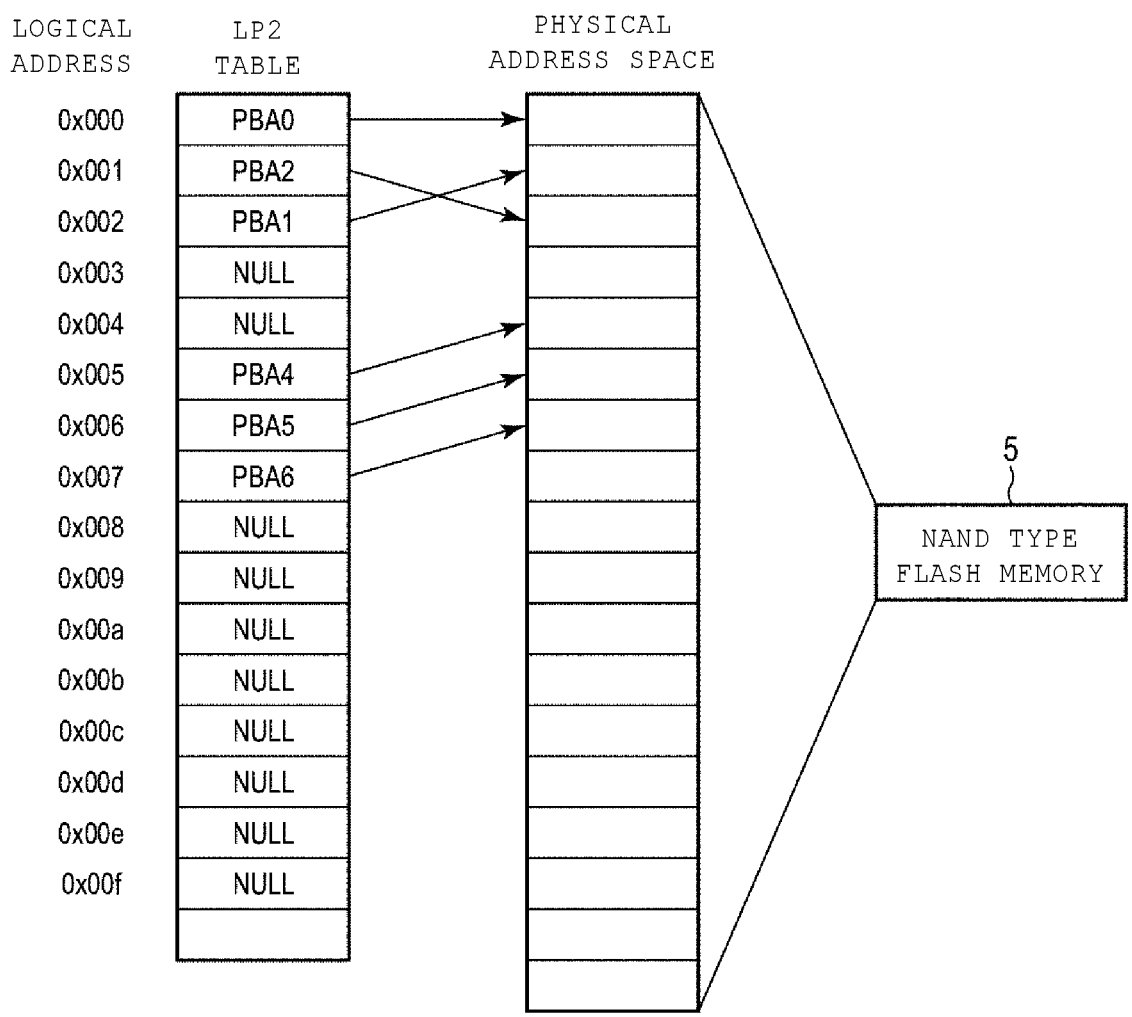
FIG. 2 is a diagram of a logical physical address translation table (L2P table) used in a memory system according to a first embodiment.

FIG. 2 is a diagram illustrating a configuration example of a L2P table 37. Here, a configuration example of the L2P table 37 when the logical address such as an LBA is used as the logical area identifier will be described. The L2P table 37 manages a mapping between each logical address in a logical address space of the SSD 3 and each physical address in a physical address space of the NAND type flash memory 5 with the unit of a predetermined management size called a cluster. A single cluster has a size which is an integral multiple of the size of a sector specified by the logical address (also referred to as a logical block when the logical address is an LBA). An example of the size of the sector is 512 B or 4 KiB, and an example of the size of the cluster is 4 KiB. In a large capacity SSD, the size of the cluster may be larger than 4 KiB. Data corresponding to a plurality of clusters may be stored in a single page. An example of the size of a single page is 16 KiB.

In the L2P table 37, a physical address corresponding to a certain logical address indicates the latest physical storage position in the NAND type flash memory 5 where data corresponding to this logical address was written.

The L2P table 37 includes a plurality of entries corresponding to a plurality of logical addresses, respectively. Each LP2 table entry corresponding to a certain logical address stores a physical address associated with this logical address. For example, if the controller 4 writes data associated to a certain logical address to a certain physical storage position in the NAND type flash memory 5, the controller 4 updates the L2P table 37 to associate the physical address PBA indicating this storage position with this logical address.

FIG. 2 illustrates a case where physical addresses PBA0, PBA2, PBA1, PBA4, PBA5, and PBA6 are associated with logical addresses 0x000, 0x001, 0x002, 0x005, 0x006, and 0x007, respectively. When data corresponding to a certain logical address has not yet been written in the NAND type flash memory 5, a predetermined constant (e.g., a Null value) may be stored in the entry corresponding to this logical address.

Referring back to the description of FIG. 1, in the NAND type flash memory 5, data may be written to a page only once per erasing cycle (program/erase cycle) of the block containing the page. That is, new data may not be directly overwritten to an area in the block to which data has already been written. Therefore, when updating the already written data before an erasing cycle, the controller 4 writes the new (updated) data to a still unwritten area in the block (or in another block), and treats the previously written data as invalid data. In other words, the controller 4 writes update data corresponding to a certain logical area identifier to another physical storage position, not the physical storage position where the previous data corresponding to this logical area identifier was stored. Then, the controller 4 updates the L2P table 37 to associate the new physical address for the newly written physical storage position with this logical area identifier and invalidate the previous data location.

Block management executed by the FTL may also include management of defective blocks (bad blocks), wear leveling, and garbage collection (compaction).

Wear leveling is an operation for equalizing the number of rewrites (the number of program/erase cycles) of each block.

Garbage collection is an operation for reducing the number of blocks in which both valid data and invalid data coexist so as to increase the number of free blocks. A free block in this context means a block containing no valid data.

Valid data in this context means the latest data stored in a logical area associated with a certain logical area identifier. For example, data stored in a physical storage position that can be referenced/addressed via the L2P table 37 (i.e., data associated with a logical area identifier as the latest data) is valid data. The valid data may later be potentially read for the host 2.

Invalid data in this context means data presently stored in a physical storage position without a corresponding logical address association in the L2P table 37. For example, data stored in a physical storage position not referenceable via the L2P table 37 (i.e., data not associated with any logical area identifier) is invalid data. The invalid data is data that may no longer be potentially read from the host 2. When update data is stored in a logical area associated with a certain logical area identifier, any valid data previously stored in association the logical area up until that point becomes invalid data, and the update data becomes the new valid data stored in association with the logical area identifier. Additionally, if an unmap operation (to be further described later) is performed on a logical area associated with a certain logical area identifier, previously valid data stored in the logical area then becomes invalid data as a result.

In garbage collection, the controller 4 copies valid data of a few blocks in which valid data and invalid data coexist together to other blocks (e.g., free blocks). The controller 4 updates the L2P table 37 to map the copy destination physical address to each logical area identifier of the copied valid data. The block which contains only invalid data after the valid data has been copied to the other block is released (designated) as a free block. Thereby, this block may be reused to write data after a data erasing operation.

In addition to the above-described NAND interface (I/F) 13, the controller 4 includes a host interface (I/F) 11, a CPU 12, a DRAM interface (I/F) 14, a direct memory access controller (DMAC) 15, a static RAM (SRAM) 16, and an ECC encode/decode unit 17. The host I/F 11, the CPU 12, the NAND I/F 13, the DRAM I/F 14, the DMAC 15, the SRAM 16, and the ECC encode/decode unit 17 are interconnected via a bus 10.

The host I/F 11 is a host interface circuit configured to execute communication with the host 2. The host I/F 11 may be, for example, a SATA interface controller, a SAS interface controller, a PCIe controller, or an Ethernet controller.

The host I/F 11 receives various commands from the host 2. A SATA interface uses an ATA command defined by the ATA standard, a SAS interface uses an SCSI command defined by the SCSI standard, and a PCIe interface and an Ethernet interface use an NVMe command defined by the NVM Express (NVMe)® standard. These commands include a write command, a read command, and an unmap command.

The write command is a command (also referred to as a "write request") that requests the SSD 3 to write user data (user data to be written is also referred to as "write data") to an area of the NAND type flash memory 5 mapped to an area indicated by a logical area identifier. When a combination of a logical address (particularly, an LBA) and a namespace identifier is used as a logical area identifier, the write command may include, for example, a namespace identifier identifying a certain namespace, a logical address (start LBA) in this namespace, the size of the write data (e.g., the number of sectors to be written), and a data pointer (such as a buffer address or the like) indicating the position in a memory of the host 2 where the write data is stored. The start LBA indicates an LBA of a first sector among one or more sectors in a logical area to which the write data needs to be written.

The read command is a command (also referred to as a "read request") that requests the SSD 3 to read data from an area of the NAND type flash memory 5 mapped to an area indicated by a logical area identifier specified by the read command. When a combination of a logical address (particularly, an LBA) and a namespace identifier is used as a logical area identifier, the read command may include a namespace identifier identifying a certain namespace, a logical address (start LBA) in this namespace, the size of data to be read (the number of sectors), and a data pointer (buffer address) indicating the position in the memory of the host 2 where this data needs to be transferred. The start LBA indicates an LBA of a first sector among one or more sectors in a logical area in which data to be read is stored.

The unmap command notifies the SSD 3 of an unmap target logical area as a logical area identifier. The unmap command is a command that deletes information indicating a physical area of the NAND type flash memory 5 corresponding to the logical area from the L2P table 37 and invalidates data recorded in the physical area. When a combination of a logical address (particularly, an LBA) and a namespace identifier is used as a logical area identifier, the controller 4 stores NULL values in the entries of the L2P table 37 corresponding to all logical address ranges (LBA ranges) specified by the unmap command, or deletes a physical address from each of these entries. This unmap operation invalidates data associated with each LBA in this LBA range.

A command that can be received from the host 2 may be a command requesting a secure erase of specific secure erase target data stored in a specific logical area. Such a command may be referred to as a specific secure erase command, a targeted secure erase command, or more simply a targeted erase command). The specific logical area is an area that is logically identified by a logical area identifier specified by the host 2.

The secure erase target data includes both data that is presently stored in a specific logical area and data that was previously stored in the specific logical area. The data that is presently stored in the specific logical area means the valid data currently stored in the specific logical area. The data that was previously stored in the specific logical area means invalid data that was invalidated by, for example, writing of update data to the specific logical area. In the SSD 3, since update data is written to another physical storage position, rather than the physical storage position where old data was stored, data can be updated while the old data remains in the old physical storage position as invalid data. The secure erase target data also includes such invalid data.

In the following description, the specific logical area to be secure erased can be referred to as a secure erase target logical area, and the data that is and/or was previously stored in the secure erase target logical area can be referred to as the secure erase target data. The secure erase target logical area is logically identified by a logical area identifier.

A specific secure erase command is, for example, a command that specifies a logical area identifier identifying a secure erase target logical area, and also requests secure erase of secure erase target data.

Alternatively, a specific secure erase command may be a command that requests secure erase of secure erase target data without specifying a logical area identifier that identifies a secure erase target logical area. In this case, the host 2 first sends one or more commands that specify a logical area identifier identifying the secure erase target logical area to the SSD 3. The host 2 then sends a specific secure erase command requesting secure erase of secure erase target data to the SSD 3.

When the logical area identifier identifying the secure erase target logical area is a namespace identifier, the secure erase target logical area is a namespace identified by the namespace identifier. In this case, secure erase target data is data that is and/or was stored in the namespace identified by the namespace identifier.

That is, in a case where the controller 4 is configured to manage a plurality of namespaces individually identified by a plurality of namespace identifiers, the namespace identifiers may be used as logical area identifiers identifying secure erase target namespaces.

When the logical area identifier identifying the secure erase target logical area is a logical address such as an LBA, the secure erase target logical area is a sector identified by the logical address, and secure erase target data is data that is and/or was stored in the sector identified by this logical address. When there is a plurality of namespaces, a combination of a namespace identifier and a logical address may be used as the logical area identifier identifying the secure erase target logical area.

A specific secure erase command may specify one or more logical addresses that identify one or more secure erase target sectors. In this case, the specific secure erase command may specify a logical address range (e.g., an LBA range specified by a logical address indicating the beginning of a logical area and the number of sectors from the logical address). When it is desired to set a plurality of logical address ranges to a secure erase target, the host 2 may first send a plurality of commands each specifying a secure erase target logical address range to the SSD 3, and then may send a specific secure erase command requesting secure erase of the previously identified secure erase target data to the SSD 3. The specific secure erase command may also include a plurality of parameters that specify the plurality of logical address ranges to be targeted. Also, in this case, if there is a plurality of namespaces, a combination of the namespace identifier and the logical address range may be a single logical area identifier that identifies a secure erase target logical area.

When the controller 4 supports a key-value store, a key of the key-value store may be used as a logical area identifier that identifies a secure erase target logical area. In this case, the secure erase target logical area is a logical area in which a value identified by the key is stored, and secure erase target data is data that is and/or was stored in a logical area identified by this key. A specific secure erase command may specify one or more keys that identify one or more secure erase target values.

In the first embodiment, a combination of a namespace identifier and a logical address (LBA) is used as a logical area identifier specified by an I/O command such as a write command or a read command. The combination of the namespace identifier and the logical address (LBA) specified by the I/O command indicates an access target logical area. When the controller 4 supports a key-value store, a key of the key-value store or a combination of a namespace identifier and the key indicates an access target logical area.

Figure 3:
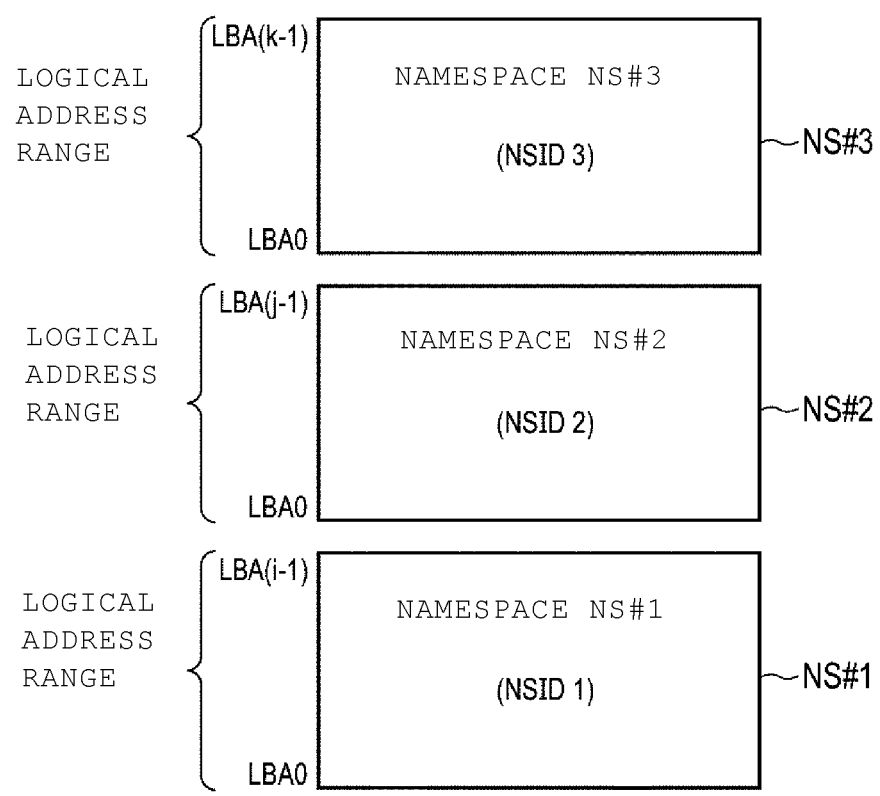
FIG. 3 is a diagram illustrating a plurality of namespaces managed in a memory system according to a first embodiment.

FIG. 3 is a diagram illustrating a plurality of namespaces managed in the SSD 3.

FIG. 3 illustrates a case where the controller 4 manages a namespace NS #1 (NS #1), a namespace NS #2 (NS #2), and a namespace NS #3 (NS #3). Each namespace is identified by a namespace identifier (NSID). Each namespace contains a set of a plurality of consecutive logical addresses (LBAs). A logical address range corresponding to each namespace starts from LBA0. Each namespace may be set to any size. The size of each namespace corresponds to the number of LBAs contained in each namespace.

FIG. 3 illustrates a case where the namespace NS #1 includes a plurality of consecutive LBAs from LBA0 to LBA(i−1), the namespace NS #2 includes a plurality of consecutive LBAs from LBA0 to LBA(j−1), and the namespace NS #3 includes a plurality of consecutive LBAs from LBA0 to LBA(k−1).

When the namespace NS #1, the namespace NS #2, and the namespace NS #3 are managed by the controller 4, a base address may be defined for each namespace so that the namespace NS #1, the namespace NS #2, and the namespace NS #3 are mapped to a single internal logical address space of the SSD 3 by using a single L2P table 37. Alternatively, the L2P table 37 may be created for each namespace.

Referring back to the description of FIG. 1, the CPU 12 is a processor configured to control the host I/F 11, the NAND I/F 13, the DRAM I/F 14, the DMAC 15, the SRAM 16, and the ECC encode/decode unit 17. The CPU 12 performs various processings by loading a control program (firmware) from the NAND type flash memory 5 or a ROM (not illustrated) onto the SRAM 16 in response to the power-on of the SSD 3, and executing the firmware. The firmware may be loaded onto the DRAM 6. The CPU 12 may execute, for example, a command processing for processing various commands from the host 2. An operation of the CPU 12 is controlled by the above-mentioned firmware. A part or the entirety of the command processing may be executed by the dedicated hardware in the controller 4.

This firmware causes the CPU 12 to function as a namespace management unit 21, a write controller 22, a read controller 23, and an erase controller 24.

The namespace management unit 21 performs, for example, creation, management, and deletion of a namespace based on a namespace management command received from the host 2.

The write controller 22 processes a write command received from the host 2 via the host I/F 11. The write command specifies, for example, a namespace identifier (NSID), a start LBA, and the size of write data. The write controller 22 writes write data associated with the write command received from the host 2 via the host I/F 11 to the NAND type flash memory 5 via the NAND I/F 13. Then, the write controller 22 updates the L2P table 37 so that each LBA corresponding to the write data is associated with a physical address to which the write data is written.

The read controller 23 processes a read command received from the host 2 via the host I/F 11. The read command specifies, for example, a namespace identifier (NSID), a start LBA, and the size of read target data. The read controller 23 acquires a physical address in which read target data is stored by referring to the L2P table 37. Then, the read controller 23 reads the read target data from the NAND type flash memory 5 via the NAND I/F 13.

The erase controller 24 performs secure erase of secure erase target data stored in a secure erase target logical area identified by a logical area identifier by a physical secure erase method in response to a specific secure erase command received from the host 2 via the host I/F 11. The erase controller 24 may include an unmap unit 24a, a garbage collection (GC) unit 24b, and a secure erase unit 24c.

The unmap unit 24a performs an unmap operation of invalidating the secure erase target data. For example, the unmap unit 24a unmaps logical area identifiers identifying all logical areas in the secure erase target logical area.

The GC unit 24b selects each block that stores the secure erase target data and valid data among data excluding the secure erase target data as a GC target block (copy source block). The secure erase target data may be valid data and/or invalid data in the secure erase target logical area. The valid data among the data excluding the secure erase target data is valid data stored in a logical area other than the secure erase target logical area. The GC unit 24b executes a copy operation of copying only the valid data among the data excluding the secure erase target data from the copy source block to a copy destination block. Due to the unmap operation and the copy operation, the copy source block becomes a block in which no valid data is stored.

After the copy operation is executed, the secure erase unit 24c performs at least a data erasing operation on the block that stores the secure erase target data including the copy source block, thereby performing secure erase of the secure erase target data by a physical secure erase method.

Other components in the controller 4 will be described.

The NAND I/F 13 is a NAND controller configured to control the NAND type flash memory 5 under the control of the CPU 12.

The DRAM I/F 14 is a DRAM controller configured to control the DRAM 6 under the control of the CPU 12.

A part of the storage area of the DRAM 6 may be used as a write buffer 31, a read buffer 32, and a command buffer 33. Further, a part of the storage area of the DRAM 6 may be used as a secure erase target block list 34, a free block list 35, an active block list 36, and an area storing the L2P table 37.

The write buffer 31 temporarily stores data to be written to the NAND type flash memory 5.

The read buffer 32 temporarily stores data read from the NAND type flash memory 5.

The command buffer 33 temporarily stores a command received from the host 2 until the command is executed.

The secure erase target block list 34 stores a block identifier of each block in which secure erase target data is stored.

The free block list 35 stores a block identifier of each free block. The free block is a block in which no valid data is stored.

The active block list 36 stores a block identifier of each active block. The active block is a block in which valid data is stored.

Next, an operation of safely and surely erasing data by a physical secure erase method (hereinafter, referred to as a physical secure erase operation) will be described.

Figure 4:
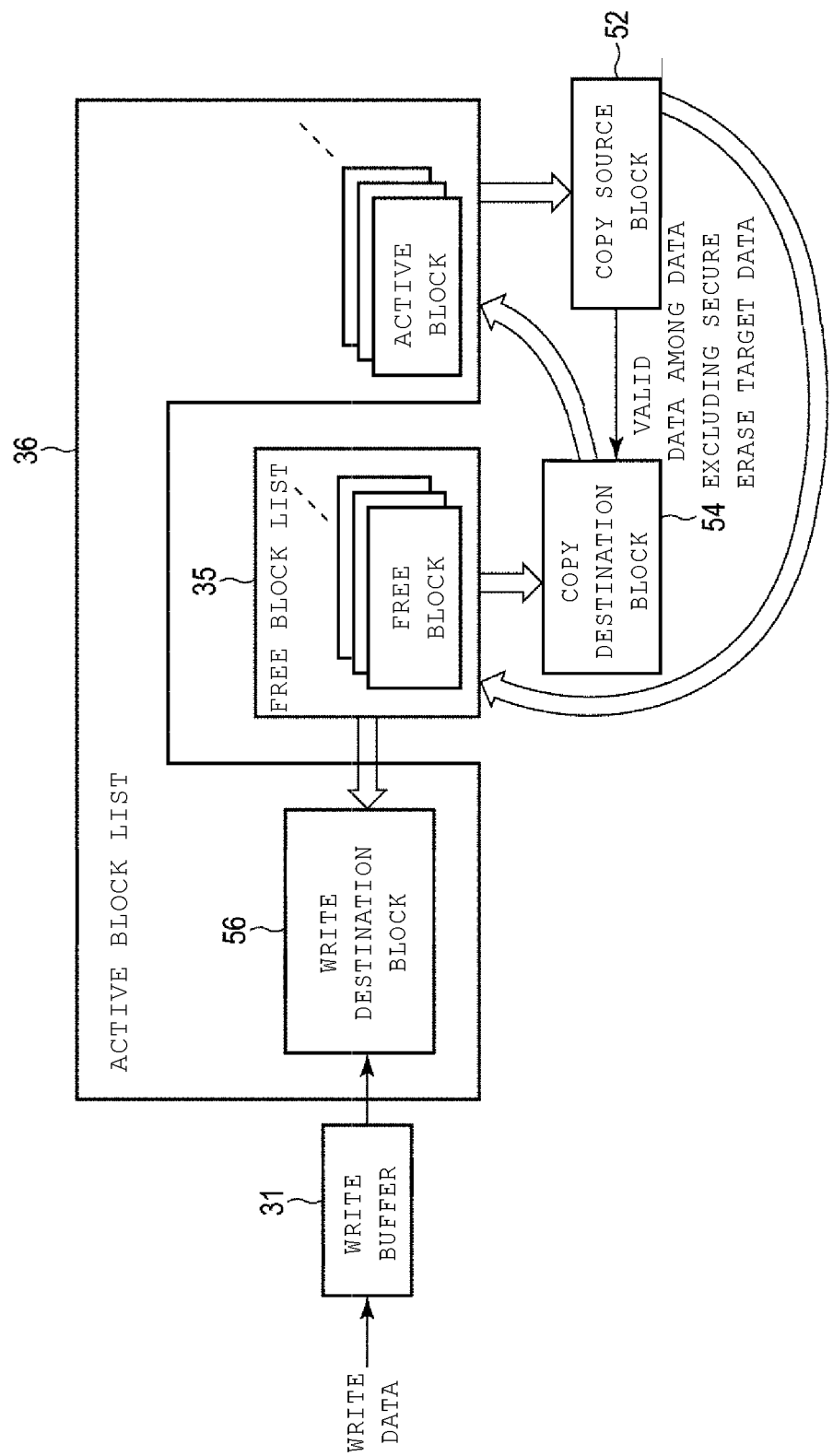
FIG. 4 depicts aspects related to a write operation and a physical secure erase operation executed in a memory system according to a first embodiment.

FIG. 4 illustrates an outline of a write operation and a physical secure erase operation performed in the SSD 3. A description of the write operation will be followed by a description of the physical secure erase operation.

The write controller 22 writes write data to the write buffer 31. When a write destination block 56 is not allocated, the write controller 22 selects one free block among the free blocks managed by the free block list 35, and performs block erase on the selected free block to allocate the block-erased free block as the write destination block 56.

The write controller 22 writes the write data of the write buffer 31 to a writable page of the write destination block 56. The write controller 22 updates the L2P table 37. When the write data is written to the write destination block 56, the write destination block 56 becomes a block in which data is partially written (hereinafter, also referred to as a block in the middle of write). Since the block in the middle of write also stores valid data, such a block is managed as the active block.

When there are no writable page in the write destination block 56 because the write destination block 56 is filled with write data, the write controller 22 allocates a new free block as a write destination block, and writes the write data of the write buffer 31 to a writable page of the newly allocated write destination block.

Next, an unmap operation and a garbage collection operation executed in the physical secure erase operation will be described.

When a specific secure erase command instructing secure erase of data in a logical area specified by a logical area identifier is received from the host 2, the unmap unit 24a unmaps logical area identifiers that identify all logical areas specified by the specific secure erase command. In other words, the unmap unit 24a executes an unmap operation of invalidating secure erase target data. Thereby, all secure erase target data becomes invalid data. An active block having no valid data is removed from the active block list 36, and is instead managed by the free block list 35.

Then, the GC unit 24b executes a garbage collection operation. In this garbage collection operation, the GC unit 24b copies only valid data among data excluding secure erase target data from one or more first blocks in which the secure erase target data is stored to one or more copy destination blocks. The data excluding the secure erase target data is data not specified as secure erase target data.

Thus, an active block group does not include a block in which secure erase target data and valid data among data excluding the secure erase target data coexist. Since one or more first blocks (copy source blocks) do not include valid data among data excluding secure erase target data, it is possible to handle each of the one or more first blocks as a free block. Thus, the one or more first blocks are removed from the active block list 36, and are instead managed by the free block list 35.

Next, a detailed example of a garbage collection operation executed by the GC unit 24b will be described. Secure erase target data is, for example, any one of (i) data (user data) of a secure erase target namespace identified by a namespace identifier when only this namespace identifier is specified by a specific secure erase command, (ii) data in a logical area identified by a namespace identifier and an LBA range when a combination of this namespace identifier and the LBA range is specified by a specific secure erase command, and (iii) a value identified by a key when the key of a key-value store is specified by a specific secure erase command.

The GC unit 24b selects an active block that stores secure erase target data as a copy source block 52.

The GC unit 24b selects a single free block among the free blocks managed by the free block list 35. The GC unit 24b performs block erase on the selected free block. Then, the GC unit 24b allocates the block-erased free block as a copy destination block 54.

The GC unit 24b copies valid data among data excluding secure erase target data, i.e., secure erase non-target valid data from the copy source block 52 to the copy destination block 54. The GC unit 24b updates the L2P table 37 to associate a physical address indicating a copy destination physical storage position where valid data is copied with a logical area identifier of the copied valid data. The secure erase target data in the copy source block 52 remains in the unmapped state. The copy destination block 54 to which the valid data is copied becomes an active block and is managed by the active block list 36.

When all valid data in the copy source block 52 is completely copied, the copy source block 52 becomes a free block and is managed by the free block list 35.

The GC unit 24b selects another active block that stores secure erase target data as the new copy source block 52. The GC unit 24b copies secure erase non-target valid data from the new copy source block 52 to the copy destination block 54. The GC unit 24b updates the L2P table 37 to associate a physical address indicating a copy destination physical storage position where valid data is copied with a logical area identifier of the copied valid data. The secure erase target data in the copy source block 52 remains in the unmapped state.

When the copy destination block 54 is filled with data, i.e., when there is no writable page in the copy destination block 54, the GC unit 24b selects a single free block among the free blocks managed by the free block list 35. The GC unit 24b performs block erase on the selected free block.

Then, the GC unit 24b allocates the block-erased free block as the new copy destination block 54.

Since the copy source block from which the valid data is completely copied is managed as a free block by the free block list 35, such a copy source block may be reused as the copy destination block 54. The GC unit 24b may select, as a copy destination block, a copy source block made to a free block by a copy operation. In this case, the GC unit 24b performs block erase on this selected block. Thus, secure erase target data in the copy source block made to a free block by the copy operation is erased. The GC unit 24b allocates the block-erased block as the new copy destination block 54. Then, the GC unit 24b copies secure erase non-target valid data from the copy source block 52 to the copy destination block 54. By reusing the copy source block made to a free block as the copy destination block 54 in this way, the secure erase target data of the copy source block is erased by block erase, and is overwritten by the secure erase non-target valid data.

In this way, the GC unit 24b performs at least block erase on the copy source block made to a free block by the copy operation in which no valid data is stored.

When the garbage collection operation is completed for all active blocks storing secure erase target data, the secure erase target data does not exist in any block other than free blocks.

Next, an example of the above-mentioned block erase operation executed in the physical secure erase operation will be described.

After the garbage collection operation is executed, the secure erase unit 24c performs at least block erase on one or more first free blocks that store secure erase target data among the free blocks managed by the free block list 35.

Here, the one or more first free blocks include (i) one or more blocks that are not used as copy destination blocks among one or more copy source blocks made to free blocks by a copy operation in which no valid data is stored and (ii) one or more free blocks that are not used as copy destination blocks among free blocks which exist before the start of the garbage collection operation and store invalid data in a secure erase target logical area. In (ii), the invalid data in the secure erase target logical area includes data already invalidated before the start of the physical secure erase operation among data in the secure erase target logical area.

The secure erase unit 24c performs processing for finding free blocks corresponding to (i) and free blocks corresponding to (ii) from the free blocks managed by the free block list 35, and performs at least block erase on each of the found free blocks. Alternatively, the secure erase unit 24c may perform at least block erase on each of all free blocks managed by the free block list 35.

As a result, secure erase target data stored in each block remaining as a free block after the garbage collection operation is securely erased by at least block erase. Further, secure erase target data that is stored in a few blocks reused as copy destination blocks is securely erased by overwrite (i.e., block erase+overwrite).

After the garbage collection operation is executed, the secure erase unit 24c may perform block erase on each free block storing secure erase target data, and further, may write a specific data pattern such as all zero, all 1, or combinations thereof on each free block. Thus, all secure erase target data is securely erased by block erase and overwrite by a specific data pattern.

In the following, it is assumed a first specific command requesting secure erase of data of a specific namespace is a specific secure erase command. In this example, the first specific command uses a namespace identifier that identifies a specific namespace as a logical area identifier indicating a secure erase target logical area.

FIG. 5 is a flowchart illustrating a procedure of a physical secure erase operation executed in the memory system according to the first embodiment.

When the controller 4 receives a command from the host 2 (step S102), the CPU 12 determines whether this received command is a first specific command (step S104).

When it is determined that the received command is not a first specific command ("NO" in step S104), the CPU 12 executes processing according to the received command (step S106).

When it is determined that the received command is a first specific command ("YES" in step S104), the unmap unit 24a executes an unmap operation invalidating all data of the secure erase target namespace (step S112).

In step S112, for example, the unmap unit 24a deletes physical addresses from the respective entries of the L2P table 37 corresponding to all LBAs of the secure erase target namespace. The unmap unit 24a also stores NULL values in these entries. By this unmap operation, all clusters in the L2P table 37 corresponding to the secure erase target namespace are invalidated. That is, data associated with all clusters corresponding to the secure erase target namespace is internally recognized as data that may be discarded. As a result, all data in the secure erase target namespace becomes invalid data.

When all data stored in a certain active block is secure erase target data, this active block becomes a free block that stores only invalid data at the end of the unmap operation.

When a certain active block stores both secure erase target data and valid data of a secure erase non-target namespace, this active block stores invalid data among the secure erase target data and the valid data of the secure erase non-target namespace at the end of the unmap operation.

The GC unit 24b executes a garbage collection operation (GC operation) so that the block in which the secure erase target data (invalid data) and the valid data of the secure erase non-target namespace coexist disappears from the active block group (step S114).

The GC unit 24b selects at least all active blocks that store invalid data of the secure erase target namespace as GC target blocks (i.e., copy source blocks). Alternatively, when the garbage collection operation is simply implemented, the GC unit 24b may select at least all active blocks storing invalid data as copy source blocks regardless of whether the invalid data is invalid data of the secure erase target namespace.

The GC unit 24b may save a block identifier of each active block selected as a copy source block in the secure erase target block list 34.

The GC unit 24b may examine which namespace data the block stores based on, for example, information illustrated in FIGS. 6A and 6B.

FIGS. 6A and 6B illustrate examples of a data structure written to a block. In the example of FIG. 6A, a pair of a namespace identifier and an LBA and data identified by the pair are written on each page. Therefore, the GC unit 24b may determine whether a block containing the page stores data of a secure erase target namespace by reading the pair of the namespace identifier and the LBA on each page.

In another example of a data structure written to a block, as illustrated in FIG. 6B, in addition to the information in FIG. 6A, a list of namespace identifiers of namespaces containing data in this block is written to any page (e.g., the last page). Therefore, the GC unit 24b may determine whether this block stores data of a secure erase target namespace by reading only the list of the namespace identifiers stored in the last page of each block without reading all pages of each block.

Referring back to the description of step S114 of FIG. 5, the GC unit 24b freely selects any one of free blocks. The GC unit 24b performs block erase on the selected free block. The GC unit 24b allocates the block-erased free block as the copy destination block 54.

The GC unit 24b copies valid data among data excluding secure erase target data, i.e., valid data of a secure erase non-target namespace from the copy source block 52 to the copy destination block 54. The GC unit 24b updates the L2P table 37 to map each LBA of the valid data of the secure erase non-target namespace to each copy destination physical address.

When the valid data of the secure erase non-target namespace is copied, valid data of a secure erase non-target namespace of the copy source block 52 becomes invalid data. Since all LBAs of the secure erase target namespace are unmapped before a copy operation, all data of the copy source block 52 is invalid data after the copy operation. Thus, when all valid data of the secure erase non-target namespace stored in the copy source block 52 is copied to the copy destination block, the copy source block 52 becomes a free block. Thus, when all valid data of the secure erase non-target namespaces of all copy source blocks is copied to a few copy destination blocks, the secure erase target data does not exist other than free blocks. In other words, invalid data of the secure erase target namespace exists only in a few free blocks.

The GC unit 24b determines whether the end condition of the garbage collection operation is satisfied (step S122). When all valid data of the secure erase non-target namespace is completely copied from the block in which data of the secure erase target namespace and valid data of the secure erase non-target namespace coexist, the secure erase target data (invalid data of the secure erase target namespace) disappears from the active block. That is, invalid data of the secure erase target namespace exists only in the free block. Therefore, the end condition may be that a block storing invalid data of the secure erase target namespace no longer exists from the active block group.

The GC unit 24b continues to execute the GC operation until the block storing invalid data of the secure erase target namespace disappears from the active block group (step S114 and "NO" in step S122).

When the end condition of the garbage collection operation is satisfied ("YES" in step S122), the GC unit 24b ends the GC operation. At this point, there is no possibility of invalid data of the secure erase target namespace existing other than free blocks.

The secure erase unit 24c performs at least a block erase operation on each free block in which invalid data of the secure erase target namespace is stored (step S124). The copy source block reused as the copy destination block is already block-erased by the garbage collection operation in step S114. Thus, by combining the block erase operation for each copy source block performed in step S114 with the block erase operation of step S124, all data of the secure erase target namespace is securely erased by block erase.

In step S124, the secure erase unit 24c may perform block erase on each free block in which invalid data of the secure erase target namespace is stored, and further, may write a specific data pattern to each of these free blocks. As a result, the invalid data of the secure erase target namespace stored in each free block is overwritten with the specific data pattern. The invalid data of the secure erase target namespace that is stored in the copy source block reused as the copy destination block is already overwritten with valid data of another namespace by the garbage collection operation in step S114. Thus, by combining overwrite in step S114 and overwrite in step S124, all data of the secure erase target namespace is securely erased by overwrite.

The secure erase unit 24c may perform block erase on all free blocks. Thus, the processing of step S124 of performing at least block erase on each free block in which invalid data of the secure erase target namespace is stored may be easily performed.

Alternatively, in order to reduce the number of blocks for which block erase is performed, the secure erase unit 24c may execute processing for identifying one or more free blocks in which invalid data of the secure erase target namespace is stored to perform block erase only on the one or more identified free blocks.

In both the former and the latter, one or more free blocks in which invalid data of the secure erase target namespace is stored are at least targets of the physical secure erase operation.

In the latter case, and when only the active block storing invalid data of the secure erase target namespace is a GC target block in step S114, the secure erase unit 24c may classify free blocks that exist at the start of step S124 into a group I of free blocks generated by the GC operation of step S114 and a group II of the other free blocks. The secure erase unit 24c may easily identify each free block belonging to the group I as a free block in which invalid data of the secure erase target namespace is stored without checking the content of each free block. The secure erase unit 24c may determine whether each free block belonging to the group II is a free block in which invalid data of the secure erase target namespace is stored by checking the content of each free block.

When the processing of step S124 is completed, the erase controller 24 notifies the host 2 of the completion of the first specific command by transmitting a response indicating the completion of the first specific command to the host 2 (step S126).

Next, the handling of an I/O command when a first specific command requesting secure erase of data of a specific namespace is received will be described. Possible examples of an I/O command include a write command, a read command, and an unmap command.

First, the handling of an I/O command which has been received but is incomplete when the first specific command (a specific secure erase command) is received will be described.

By processing of the first specific command, data of a secure erase target namespace is securely erased. Therefore, in principle, the controller 4 should abort any incomplete write command for the secure erase target namespace or any incomplete unmap command for the secure erase target namespace.

Alternatively, the controller 4 may wait for the processing of the incomplete write command or unmap command to be completed, and then may start execution of the first specific command after the processing of these commands is completed. In particular, some examples, the controller 4 may start execution of the first specific command only after the processing of these commands has been completed without aborting these commands if the processing of these commands is nearly completed or the like.

Figure 7:
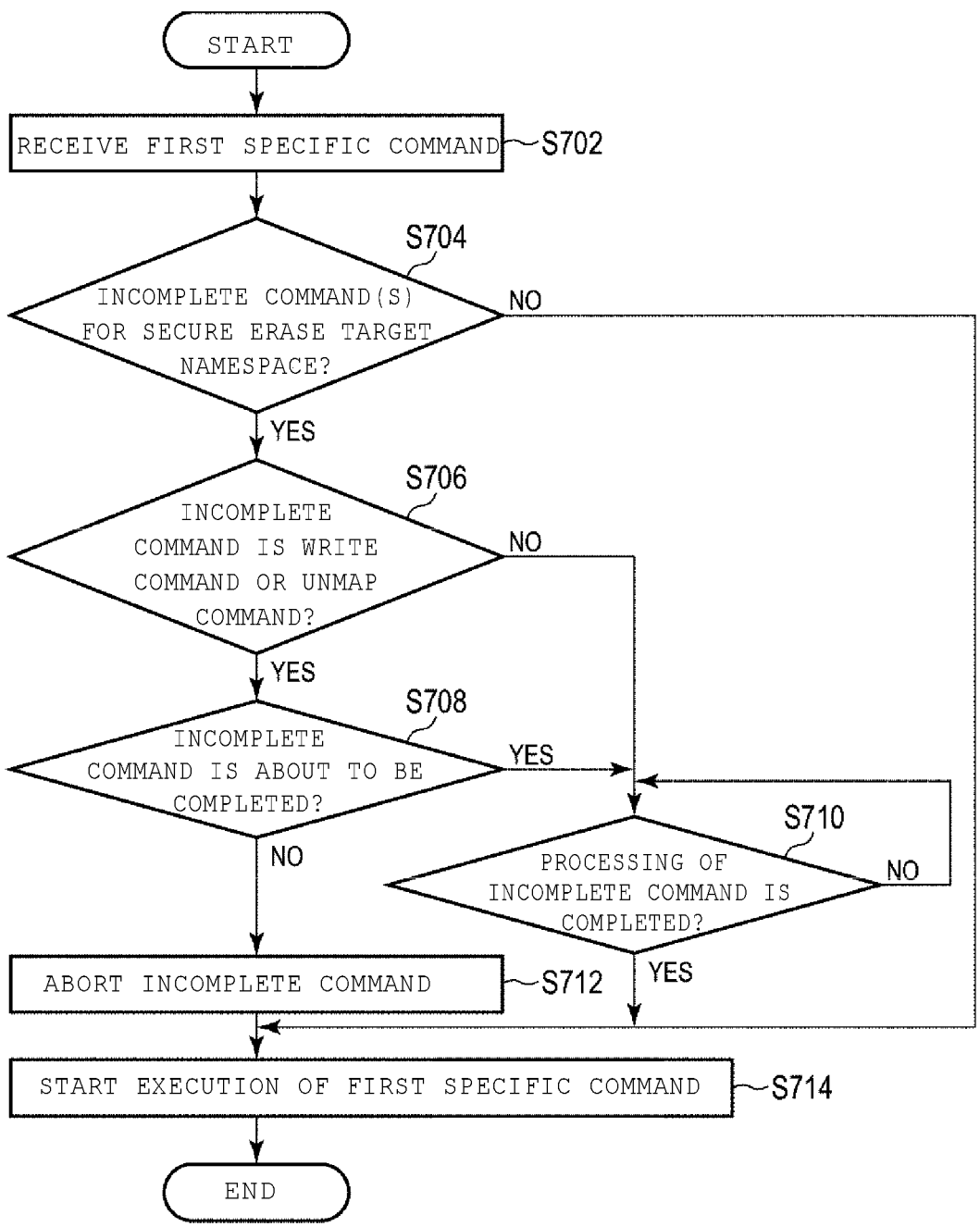
FIG. 7 is a flowchart illustrating a processing procedure for an I/O command that remains incomplete when a first specific command is received.

FIG. 7 is a flowchart illustrating a processing procedure for an I/O command which is received and is incomplete before a first specific command is received. Multiple I/O commands may be received before the first specific command is received. In such cases, the processing procedure can be repeated for each of the received I/O commands.

The controller 4 receives a first specific command requesting secure erase of data of a specific namespace from the host 2 (step S702). The controller 4 determines whether there is an I/O command for this specific namespace (secure erase target namespace) that is being executed, or an I/O command for the secure erase target namespace that is received and is not yet started to be executed (hereinafter, these I/O commands being also referred to as incomplete commands) (step S704).

When it is determined that there is an incomplete command ("YES" in step S704), the controller 4 determines whether the incomplete command is a write command or an unmap command (step S706).

When it is determined that the incomplete command is a write command or an unmap command ("YES" in step S706), the controller 4 determines whether processing of the incomplete write command or unmap command is about to be completed (step S708).

When it is determined that the processing of the incomplete write command or unmap command is not about to be completed ("NO" in step S708), the controller 4 aborts the incomplete write command or unmap command (step S712). When commands received from the host 2 are not allowed to be executed in any order (Out of order) in step S712, for example, when the write command is aborted, the controller 4 aborts all subsequent I/O commands received from the host 2 after receiving this write command.

After aborting the incomplete command, the controller 4 starts execution of the first specific command (step S714).

When it is determined that the processing of the incomplete write command or unmap command is about to be completed ("YES" in step S708), the controller 4 may not abort the incomplete write command or unmap command, and may wait for completion of the processing of the incomplete write command or unmap command (step S710). Then, in response to the completion of the processing of the uncompleted write command or unmap command ("YES" in step S710), the controller 4 starts execution of the first specific command (step S714).

When it is determined that the incomplete command for the secure erase target namespace is neither a write command nor an unmap command, i.e., when there is an incomplete read command for the secure erase target namespace ("NO" in step S706), the controller 4 does not abort the incomplete read command, and waits for completion of the processing of the incomplete read command (step S710). Then, in response to the completion of the processing of the incomplete read command, the controller 4 starts execution of the first specific command (step S714).

Figure 8:
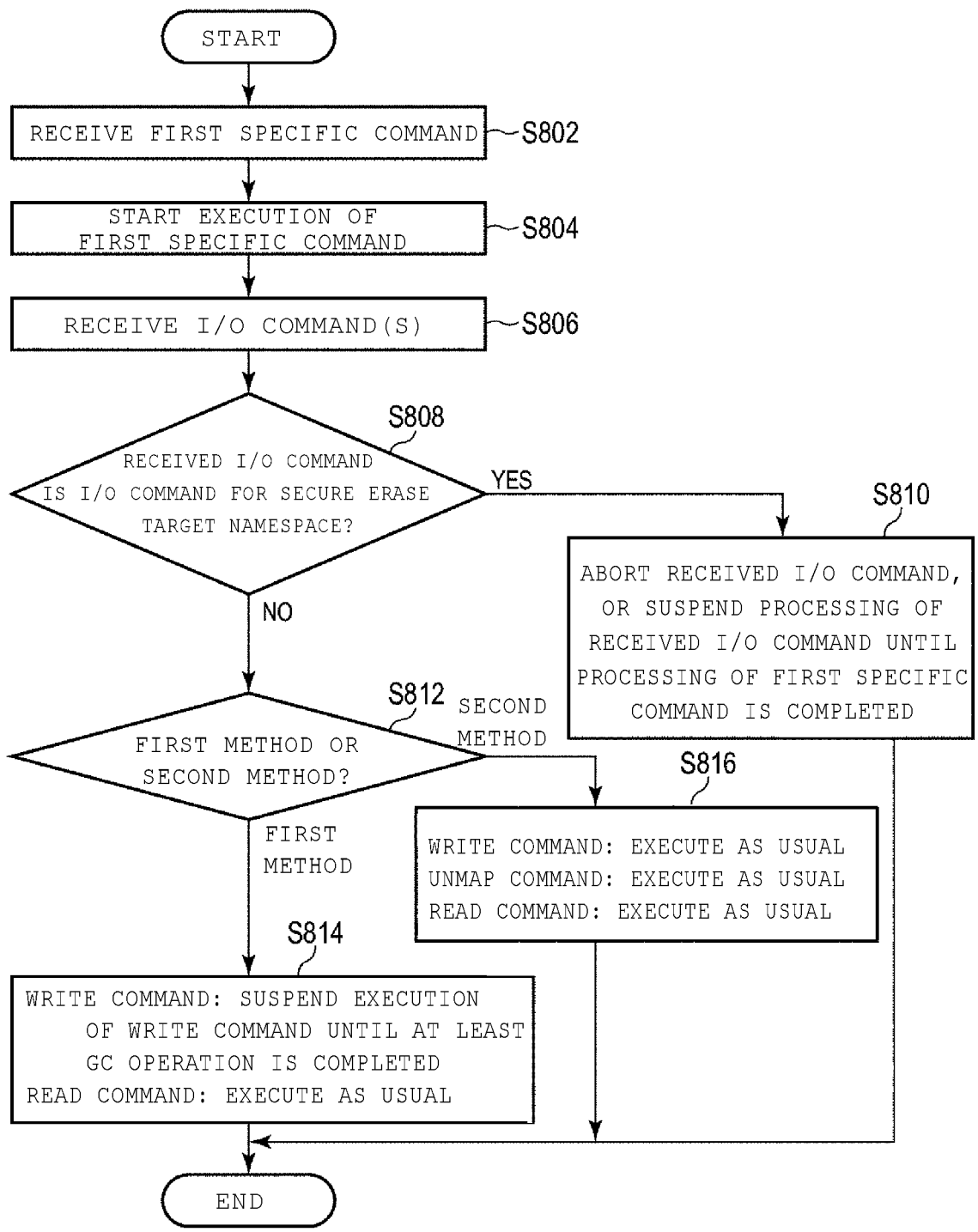
FIG. 8 is a flowchart illustrating a processing procedure for an I/O command received during execution of a first specific command.

Next, the handling of an I/O command received during execution of a first specific command will be described with reference to FIG. 8. FIG. 8 is a flowchart illustrating a processing procedure for an I/O command received during execution of a first specific command. Multiple I/O commands may be received during the execution of the first specific command. In such cases, the processing procedure can be repeated for each of the received I/O commands.

The controller 4 receives a first specific command that requests secure erase of data of a specific namespace (step S802), and starts execution of the first specific command (step S804). When receiving an I/O command during the execution of the first specific command (step S806), the controller 4 determines whether the received I/O command is an I/O command for this specific namespace (secure erase target namespace) (step S808).

When it is determined that the I/O command received during the execution of the first specific command is the I/O command for the secure erase target namespace ("YES" in step S808), the controller 4 aborts the received I/O command (step S810). Alternatively, in step S810, the controller 4 may suspend execution of the received I/O command until processing of the first specific command is completed (i.e., until completion of the first specific command is notified to the host 2), and may then execute the received I/O command after the processing of the first specific command is completed.

When it is determined that the I/O command received during the execution of the first specific command is an I/O command for a namespace other than the secure erase target namespace ("NO" in step S808), the controller 4 may selectively use the following first method or second method. Therefore, the controller 4 determines whether the first method or the second method is preselected (step S812). When it is determined that the first method is preselected, the controller 4 executes the processing of step S814. When it is determined that the second method is preselected, the controller 4 executes the processing of step S816.

First Method (step S814): When the I/O command for the other namespace is a write command, the controller 4 suspends execution of this write command until at least a GC operation is completed, and then executes the write command after the GC operation has been completed.

When the I/O command for the other namespace is a read command, the controller 4 executes this read command as usual. However, when commands received from host 2 are not allowed to be executed in any order (Out of order), the controller 4 executes read commands for other namespaces in the same order as the order in which these read commands are received. Then, when a write command for the other namespace is received following the read command for the other namespace, the controller 4 suspends processing of this received write command and all I/O commands for the other namespace following the received write command until at least a GC operation is completed. After the GC operation is completed, the controller 4 executes this received write command and all of the I/O commands for the other namespace following this received write command in the same order as the order in which these commands are received.

In the description of the first method, the controller 4 may or may not handle an unmap command in the same manner as the write command. When the controller 4 does not handle the unmap command in the same manner as the write command, the controller 4 executes the unmap command as usual in the same manner as the read command.

Second Method (step S816): When the I/O command for the other namespace is a write command, an unmap command, or a read command, the controller 4 executes this I/O command as usual. This second method has the effect that processing of the I/O command for the other namespaces is not significantly delayed, but the time required to process the first specific command increases by the amount of processing this I/O command. Furthermore, there is a possibility that invalid data generated by writing write data (updated data) associated with the write command for the other namespace may also become a target of a GC operation. In this case, the time required to process the first specific command is further increased.

Next, an example of a secure erase operation for data of a specific namespace will be described with reference to FIGS. 9A, 9B, 10, 11A, and 11B.

FIG. 9A is a diagram illustrating an example of the content of each active block before the start of a secure erase operation. FIG. 9A illustrates a case where three blocks including a block BLK0, a block BLK1, and a block BLK2 are active blocks in which valid data is stored.

The block BLK0 is an active block in the middle of write which is allocated as a write destination block. In the block BLK0, unwritten storage areas illustrated in blank remain. Each of the block BLK1 and the block BLK2 is a completely written active block in which data is written up to the end of the block.

There is a possibility that, when there are three namespaces including a namespace A, a namespace B, and a namespace C in the SSD 3, data of the namespace A, data of the namespace B, and data of the namespace C may coexist in each of the block BLK0, the block BLK1, and the block BLK2. Furthermore, there is a possibility that valid data and invalid data of each namespace may coexist in each of the block BLK0, the block BLK1, and the block BLK2. For example, invalid data is data invalidated by writing new write data (update data) associated with an LBA of this invalid data, or by an unmap command from the host 2.

FIG. 9B is a diagram illustrating an example of the content of each free block before the start of a secure erase operation. FIG. 9B illustrates a case where four blocks including a block BLK3, a block BLK4, a block BLK5, and a block BLK6 are free blocks in which no valid data is stored.

In FIG. 9B, in the free block BLK3, invalid data of the namespace A and invalid data of the namespace C are stored, but invalid data of the namespace B is not stored. The invalid data of the namespace A, the invalid data of the namespace B, and the invalid data of the namespace C are stored in each of the free blocks BLK4 to BLK6.

A case is assumed where the SSD 3 receives a first specific command requesting secure erase of data of the namespace B from the host 2 under the presence of the three active blocks illustrated in FIG. 9A and the four free blocks illustrated in FIG. 9B.

First, the unmap unit 24a executes an unmap operation of invalidating data corresponding respectively to all LBAs belonging to the namespace B.

FIG. 10 is a diagram illustrating an example of the content of each active block after the unmap operation is executed. In FIG. 10, bold letters indicate data of the namespace B newly made to invalid data due to this unmap.

Prior to execution of the unmap operation, as illustrated in FIG. 9A, the block BLK0 stored one invalid data of the namespace B and two valid data of the namespace B. As illustrated in FIG. 10, due to the unmap operation, all of the two valid data of the namespace B of the block BLK0 become invalid data.

Prior to execution of the unmap operation, as illustrated in FIG. 9A, the block BLK1 stores two invalid data of the namespace B and four valid data of the namespace B. As illustrated in FIG. 10, due to the unmap operation, all of the four valid data of the namespace B of the block BLK1 become invalid data.

Prior to execution of the unmap operation, as illustrated in FIG. 9A, the block BLK2 stores three invalid data of the namespace B and four valid data of the namespace B. As illustrated in FIG. 10, due to the unmap operation, all of the four valid data of the namespace B of the block BLK2 become invalid data.

After execution of the unmap operation, the GC unit 24b selects all of the active blocks storing the invalid data of the namespace B as GC target blocks, i.e., copy source blocks, and executes a GC operation.

In FIG. 10, each of the block BLK0, the block BLK1, and the block BLK2 as the active blocks stores invalid data of the namespace B. Thus, all of these three active blocks including the block BLK0, the block BLK1, and the block BLK2 are selected as the copy source blocks.

FIG. 11A is a diagram illustrating an example of the content of each active block after a GC operation is executed. In FIG. 11A, the symbols (A), (B), and (C) in respective physical storage positions indicate that namespaces corresponding to data previously stored in the physical storage positions are the namespace A, the namespace B, and the namespace C, respectively.

FIG. 11A illustrates a case where the blocks BLK6 and BLK5, which are free blocks before a GC operation, are used as copy destination blocks by the GC operation and become active blocks by the copy of valid data.

The block BLK6 becomes an active block by the copy of valid data from each of the block BLK1 and the block BLK2 to the block BLK6. As a result of this copy, all valid data of each of the namespace A and the namespace C stored in the block BLK1 and all valid data of each of the namespace A and the namespace C stored in the block BLK2 are stored in the BLK6.

The block BLK5 becomes an active block by the copy of valid data from the block BLK0 to the block BLK5. By this copy, all valid data of each of the namespace A and the namespace C stored in the block BLK0 are stored in the block BLK5.

Hereinafter, a GC operation of moving the state of each of the blocks BLK6 and BLK5 from the free block illustrated in FIG. 9B to the active block illustrated in FIG. 11A will be described. The GC unit 24b performs block erase on the block BLK6. Then, the GC unit 24b copies valid data of namespaces other than the namespace B from the block BLK1 to the block BLK6. At this time, the GC unit 24b copies the valid data of the namespaces other than the namespace B so as to be consecutively arranged at a plurality of physical storage positions in the block BLK6.

Further, the GC unit 24b copies valid data of namespaces other than the namespace B from the block BLK2 to the block BLK6. At this time, the GC unit 24b copies the valid data of the namespaces other than the namespace B so as to be consecutively arranged at a plurality of subsequent physical storage positions in the block BLK6.

Thus, the block BLK6 is filled with the valid data of the namespaces other than the namespace B stored in the block BLK1 and the valid data of the namespaces other than the namespace B stored in the block BLK2. As a result, invalid data of the namespace B stored in the block BLK6, which is a free block before the GC operation, is overwritten with the valid data of the namespaces other than the namespace B.

In FIG. 11A, bold letters indicate physical storage positions where data of the namespace B is erased. Referring to FIG. 11A by focusing on bold letters, it will be understood that, for example, invalid data of the namespace B stored in the block BLK6, which is a free block before the GC operation, is overwritten with valid data of the namespaces other than the namespace B.

Similarly, the GC unit 24b performs block erase on the block BLK5. Then, the GC unit 24b copies valid data of namespaces other than the namespace B from the block BLK0 to the block BLK5. At this time, the GC unit 24b copies the valid data of the namespaces other than the namespace B so as to be consecutively arranged at a plurality of physical storage positions in the block BLK5. In this example, data is not written to the end of data in the block BLK5, but the rest of the block BLK5 may be filled with dummy data such as all zero.

Referring back to FIG. 11A by focusing on bold letters, it will be understood that invalid data of the namespace B stored in the block BLK5 is either overwritten with valid data of namespaces other than the namespace B, or is block-erased.

By the above GC operation, the blocks BLK0 to BLK2 storing data (the invalid data) of the namespace B become free blocks. Furthermore, two blocks including the block BLK5 and the block BLK6, newly made into active blocks, store only valid data of namespaces other than the namespace B, and do not store the data of the namespace B. Thus, a block in which data of a secure erase target namespace and valid data of a secure erase non-target namespace coexist does not exist in the active block group.

FIG. 11B is a diagram illustrating an example of the content of each free block after a GC operation is executed. After the GC operation is executed, the free blocks managed by the free block list 35 include three blocks (BLK0, BLK1, and BLK2) which are made to free blocks by the GC operation and two blocks (BLK3 and BLK4) which are free blocks before the start of the GC operation.

Each of the free block BLK0, the free block BLK1, and the free block BLK2 is a block that becomes a free block by the GC operation and was not used as a copy destination block for the GC operation. The free block BLK0, the free block BLK1, and the free block BLK2 store invalid data of the secure erase target namespace B, but do not store valid data of the secure erase non-target namespaces A and C. Therefore, it is possible to perform block erase on each of the free block BLK0, the free block BLK1, and the free block BLK2.

By performing block erase on each of the free block BLK0, the free block BLK1, and the free block BLK2, data of the secure erase target namespace B may be securely erased from each of the free block BLK0, the free block BLK1, and the free block BLK2.

In the GC operation, any block among the free block BLK0, the free block BLK1, and the free block BLK2 may be reused as a copy destination block for the GC operation. The block reused as the copy destination block is first block-erased. Then, data of the secure erase target namespace B that is stored in the block reused as the copy destination block is overwritten with valid data of a secure erase non-target namespace copied from a copy source block. In this way, the data of the secure erase target namespace B that is stored in the block reused as the copy destination block is securely erased by overwrite performed during the GC operation.

The free block BLK3 is a block that is a free block before the start of the GC operation and was not used as a copy destination block for the GC operation.

The free block BLK3 does not store data of the secure erase target namespace B. Therefore, it is not necessary to perform block erase on the free block BLK3.

The free block BLK4 is a block that is a free block before the start of the GC operation and was not used as a copy destination block for the GC operation. The free block BLK4 stores invalid data of the secure erase target namespace B. Therefore, block erase is performed on the free block BLK4. As a result, data of the secure erase target namespace B is securely erased from the free block BLK4.

As described above, according to the first embodiment, in response to reception of a first specific command requesting secure erase of data of a specific namespace from the host 2, an unmap operation of invalidating data of a secure erase target namespace, and a GC operation of copying valid data among data of namespaces other than the secure erase target namespace from one or more blocks (copy source blocks) in which the data of the secure erase target namespace is stored to one or more copy destination blocks are executed.

Thus, since the one or more blocks in which the data of the secure erase target namespace is stored become free blocks, the data of the secure erase target namespace does not exist other than free blocks.

When a copy source block becomes a free block, this free block may be reused as a copy destination block. In this case, data of a secure erase target namespace stored in this free block can be erased by the block erase, and is then further overwritten with valid data from among data of namespaces other than the secure erase target namespace.

As described above, in the first embodiment, a part of data (valid data and invalid data) of a specified specific namespace may be securely erased by block erase and overwrite during a GC operation. Further, data of a specific namespace stored in one or more free blocks after the GC operation may be securely erased by at least block erase. As a result, all data (valid and invalid data) of the specified specific namespace is securely erased.

Next, advantages of a secure erase operation according to the first embodiment will be described as compared with certain comparative examples.

First, the difference between a configuration of an SSD according to certain comparative examples and a configuration of the SSD 3 according to the first embodiment will be described.

Comparative Example #1

In an SSD according to Comparative Example #1, a plurality of endurance groups is managed so that a plurality of namespaces belong to the plurality of endurance groups which are different from each other. The endurance group is a unit that manages a physical resource of a NAND type flash memory. All physical resources of the NAND type flash memory are divided into a plurality of endurance groups so that each block in the NAND type flash memory is used by only one endurance group. When performing secure erase on data of a specific namespace, each block in the endurance group corresponding to the specific namespace becomes a secure erase target.

Comparative Example #2

In an SSD according to Comparative Example #2, all physical resources of a NAND type flash memory belong to only one endurance group, but a correspondence between a plurality of namespaces and a plurality of blocks is managed on a one-to-one basis so that data of different namespaces will be written to different blocks. When performing secure erase on data of a specific namespace, each block mapped to the specific namespace (one-to-one) becomes a secure erase target.

First Embodiment

In the SSD 3 according to the first embodiment, a plurality of namespaces is managed to allow all physical resources of a NAND type flash memory to belong to only one endurance group while allowing data of different namespaces to coexist in the same block. This is because a secure erase operation of the first embodiment may perform a physical secure erase operation on data of a specific namespace specified by the host 2 even in an environment in which data of different namespaces coexists in the same block.

(1) Speed of User Data Erase

In the SSD 3 according to the first embodiment, it is necessary to perform a GC operation before block erase. Therefore, the speed of secure erase operation of user data is relatively slow. However, secure erase for data of a specific namespace is a case of maintaining data of a namespace in which backup data of an OS is stored and erasing data of a namespace including user data, for example, when a PC is handed over to another person. Since the frequency of use is small, the slow speed of secure erase is acceptable.

In Comparative Example #1 and Comparative Example #2, the speed of an operation for performing secure erase on user data depends on the implementation thereof, but the operation may be performed at a relatively high speed.

(2) Number of Blocks in Middle of Write

Here, a case is assumed where a configuration in which user data from a host is written to a single level cell (SLC) storage area of a NAND type flash memory and, for example, when an SSD is idle, the user data in the SLC storage area is written to a triple level cell (TLC) storage area or a quad level cell (QLC) storage area is used.

In the SSD 3 according to the first embodiment, the number of required blocks in the middle of write is two. One of the two blocks in the middle of write is an SLC block used as a write destination block for the SLC storage area. The other block in the middle of write is a TLC/QLC block used as a write destination block for the TLC/QLC storage area.

In Comparative Example #1 and Comparative Example #2, the number of required SLC blocks is the number of namespaces. The number of required TLC/QLC blocks is the number of namespaces.

(3) Over-Provisioning

In the SSD 3 according to the first embodiment and in Comparative Example #2, an over-provisioning area may be shared by a plurality of namespaces.

In Comparative Example #1, it is necessary to prepare an over-provisioning area individually for each namespace.

(4) SLC Storage Area

In the SSD 3 according to the first embodiment, since the SLC storage area is shared between namespaces, it is possible for a certain namespace to temporarily use the entire capacity of the SLC storage area.

In Comparative Example #1 and Comparative Example #2, it is necessary to prepare an independent SLC storage area for each namespace. When the capacity required for a single SLC storage area is fixed regardless of the namespace size, the number of blocks that may be allocated for the TLC/QLC storage area is reduced. Therefore, since the storage capacity of a non-volatile memory may not be used efficiently, the drive capacity (total capacity) represented by the sum of the storage capacity of the TLC/QLC storage area and the storage capacity of all SLC storage areas decreases in proportion to the number of namespaces.

(5) Alignment between Block Size and Namespace Size

Generally, the size of a single block is several tens of megabytes (MB), while the size of each namespace is an integer multiple of a sector. This may lead to an inconsistency between the block size and the namespace size.

In the SSD 3 according to the first embodiment, since a plurality of blocks may be shared by a plurality of namespaces, even when an inconsistency occurs between the block size and the namespace size, the SSD 3 is not easily affected by the inconsistency and the capacity efficiency thereof is hard to be reduced.

In Comparative Example #1 and Comparative Example #2, when an inconsistency occurs between the block size and the namespace size, the SSD is affected by the inconsistency and the capacity efficiency is reduced.

(6) Reduction in Drive Capacity by Creation of Plural Namespaces

For the reasons (2) to (5), when a plurality of namespaces is created in a single SSD, the drive capacity (e.g., usable, effect, or available storage capacity) may be reduced.

In the SSD 3 according to the first embodiment, since there is only one endurance group, it is possible to efficiently create a plurality of namespaces. Thus, there is no reduction in drive capacity due to the creation of the plurality of namespaces.

In Comparative Example #1, since an independent endurance group is required for each namespace, a reduction in drive capacity due to the creation of the plurality of namespaces is large.

In Comparative Example #2, the degree of influence on a reduction in drive capacity due to the creation of a plurality of namespaces is intermediate between the first embodiment and Comparative Example #1.

Second Embodiment

Next, a second embodiment will be described. A configuration of an SSD according to a second embodiment is substantially the same as the configuration of the SSD 3 according to the first embodiment illustrated in FIG. 1. The second embodiment is similar to the first embodiment in that a physical secure erase operation is performed on data of a specific namespace, but processing related to an unmap operation thereof is different from that of the first embodiment. In the first embodiment, the controller 4 performs an unmap operation before a GC operation, whereas in the second embodiment, the controller 4 performs an unmap operation during execution of a GC operation.

Figure 12:
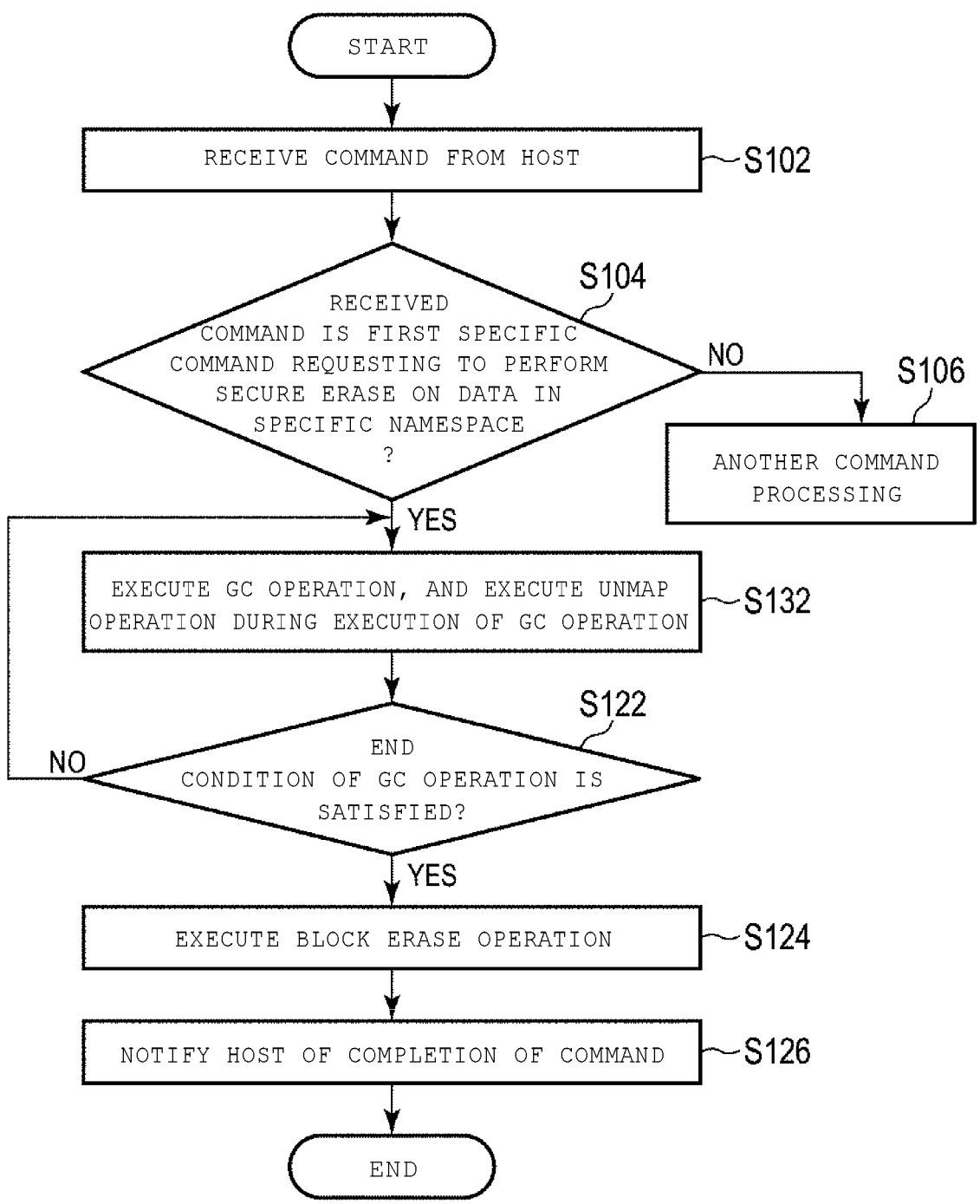
FIG. 12 is a flowchart illustrating a procedure of a physical secure erase operation executed in a memory system according to a second embodiment.

FIG. 12 is a flowchart illustrating a procedure of a physical secure erase operation executed in the memory system according to the second embodiment. A description of the same procedure as the procedure for the physical secure erase operation executed in the memory system according to the first embodiment described with reference to FIG. 5 will be omitted.

When a received command is a first specific command ("YES" in step S104), the GC unit 24b executes a GC operation, and the unmap unit 24a performs an unmap operation during execution of the GC operation (step S132).

In step S132, the GC unit 24b selects an active block storing at least data of a secure erase target namespace, i.e., secure erase target data as a GC target block (i.e., a copy source block), regardless of whether the data of the secure erase target namespace is valid data or invalid data. Alternatively, when the GC operation is simply implemented, the GC unit 24b may select all active blocks storing invalid data as the copy source block regardless of whether the invalid data is data of the secure erase target namespace.

When valid data stored in the copy source block is secure erase target data, the unmap unit 24a performs an unmap operation of invalidating the valid data stored in the copy source block. That is, the unmap unit 24a performs an unmap operation of invalidating valid data that is secure erase target data among the valid data stored in the copy source block. Thus, the valid data that is a part of the secure erase target data stored in the copy source block is invalidated. When valid data of a secure erase non-target namespace stored in the copy source block is copied to the copy destination block and valid data of the secure erase target namespace stored in the copy source block is also unmapped, the copy source block becomes a free block. As a result, the secure erase target data does not exist other than free blocks. In other words, the data (invalid data) of the secure erase target namespace exists only in certain free blocks.

After executing the GC operation and the unmap operation (step S132), determination of the end condition of the GC operation (step S122), execution of the block erase operation (step S124), and notification of the completion of the command to the host 2 (step S126) are performed as in the first embodiment.

Since the handling of an I/O command when the first specific command requesting secure erase of data in a specific namespace is executed is the same as that in the first embodiment, a description thereof will be omitted.

In the second embodiment, the same effects as in the first embodiment may also be obtained.

Third Embodiment

Next, a third embodiment will be described. A configuration of an SSD according to the third embodiment is the same as the configuration of the SSD 3 according to the first embodiment illustrated in FIG. 1. In the first and second embodiments, a namespace identifier is used as a logical area identifier indicating a secure erase target logical area, but in the third embodiment, a logical address identifying a secure erase target sector and the number of sectors from the logical address are used as a logical area identifier indicating a secure erase target logical area. For example, an LBA is used as the logical address. When the memory system has a plurality of namespaces, the logical area identifier indicating the secure erase target logical area also includes the namespace identifier indicating the secure erase target namespace.

In the third embodiment, the secure erase target data is data corresponding to one or more specific LBAs, i.e., data that is or was stored in one or more secure erase target sectors identified by the one or more specific LBAs.

A second specific command used in the third embodiment is a specific secure erase command requesting the performing of a secure erase of data identified by one or more specific LBAs, specifically, data stored in one or more secure erase target sectors identified by one or more specific LBAs. The second specific command may include parameters that specify one or more specific LBAs. The one or more specific LBAs may be represented by an LBA range.

When the host 2 sets a plurality of LBA ranges to a secure erase target, the host 2 may first send a plurality of commands each specifying an LBA range to the SSD 3, and may then send the second specific command requesting secure erase of these one or more previously specified LBA ranges to the SSD3. The second specific command may also include a plurality of parameters that specifies the plurality of LBA ranges. By specifying the plurality of LBA ranges to request secure erase in this way, a GC operation can be performed only once. Thus, the amount of copied data and the number of times a block erase is performed may be reduced as compared to a case where secure erasure is separately required for each LBA range, and memory cell wear may be reduced.

Further, when the host 2 sets one or more specific LBAs of a specific namespace or one or more specific LBA ranges to a secure erase target, the host 2 may specify a namespace identifier that identifies a specific namespace and one or more specific LBAs or one or more specific LBA ranges.

Figure 13A:
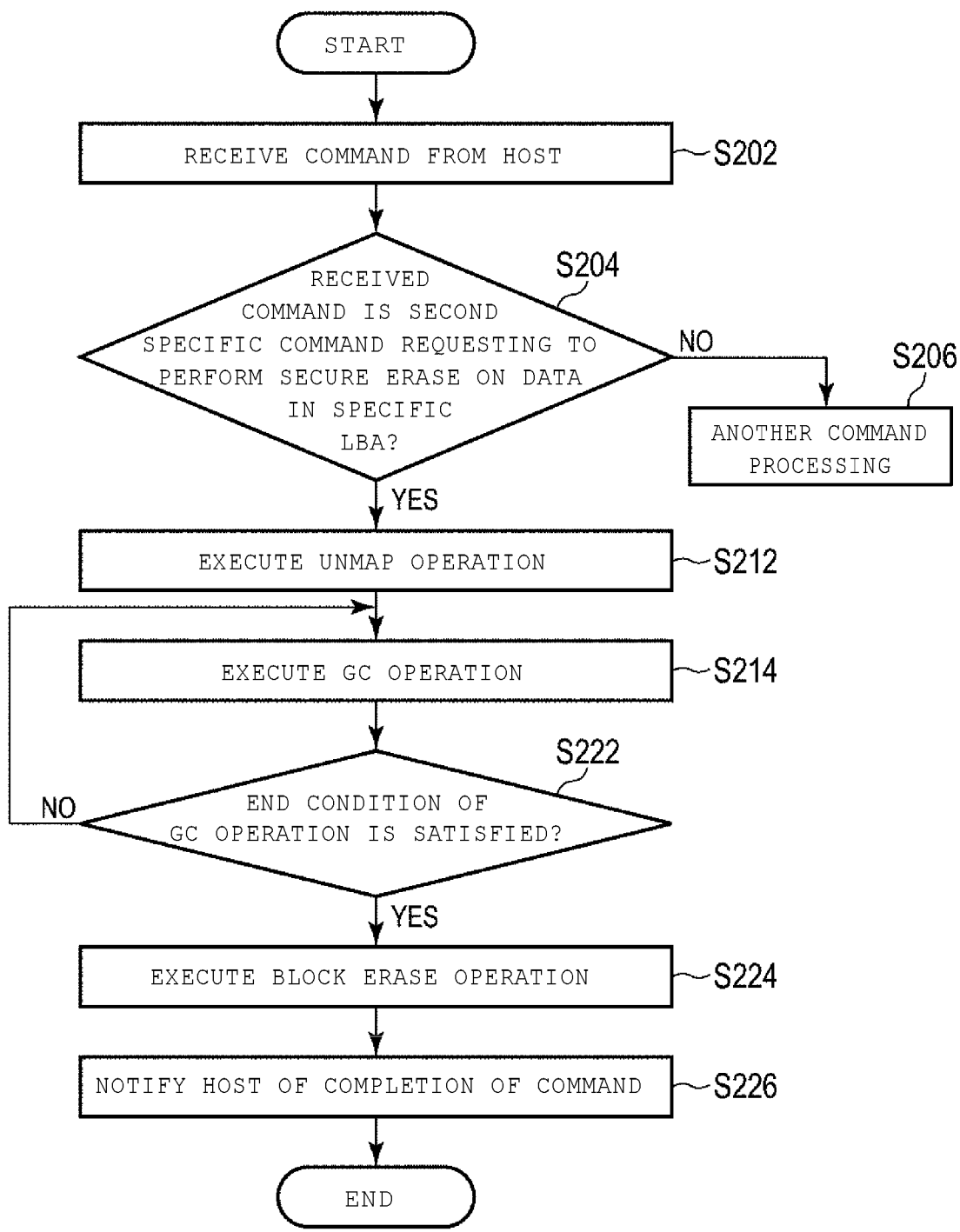
FIG. 13A is a flowchart illustrating a procedure of a physical secure erase operation executed in a memory system according to a third embodiment.

FIG. 13A is a flowchart illustrating a procedure of a physical secure erase operation executed in the memory system according to the third embodiment.

When the controller 4 receives a command from the host 2 (step S202), the CPU 12 determines whether the received command is a second specific command (step S204). The second specific command requests performing secure erase of data of one or more specific LBAs by a physical secure erase method.

When it is determined that the received command is not the second specific command ("NO" in step S204), the CPU 12 executes processing according to the received command (step S206).

When it is determined that the received command is a second specific command ("YES" in step S204), the unmap unit 24*a* performs an unmap operation (step S212). Next, the GC unit 24*b* performs a GC operation (step S214).

Figure 13B:
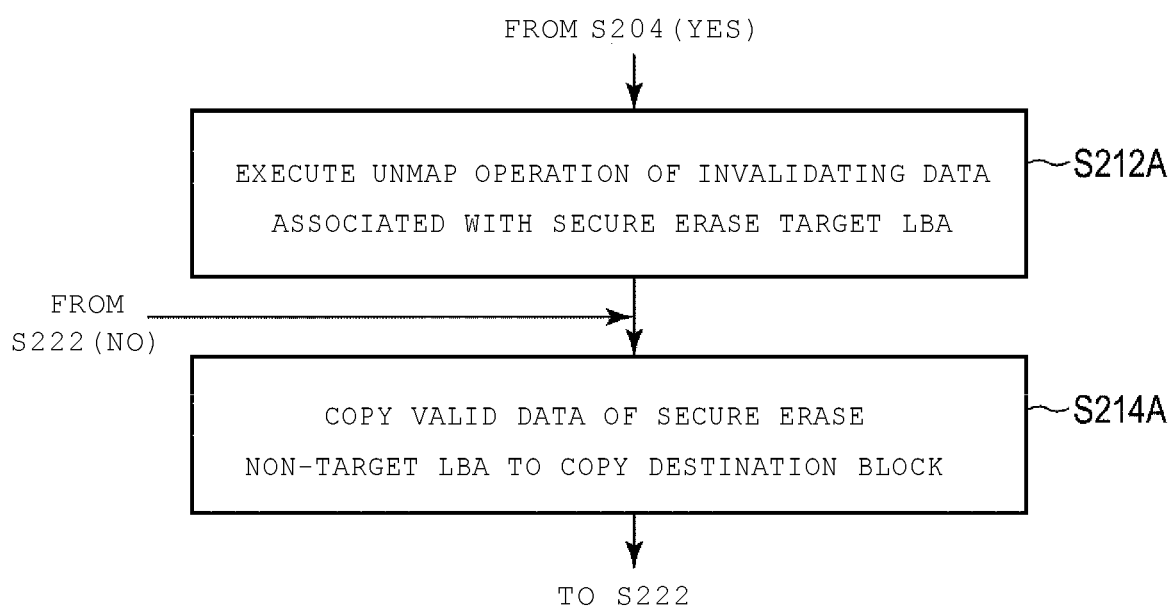
FIG. 13B is a flowchart illustrating a procedure of an unmap operation and a garbage collection operation executed in a physical secure erase operation executed in a memory system according to a third embodiment.
Figure 13C:
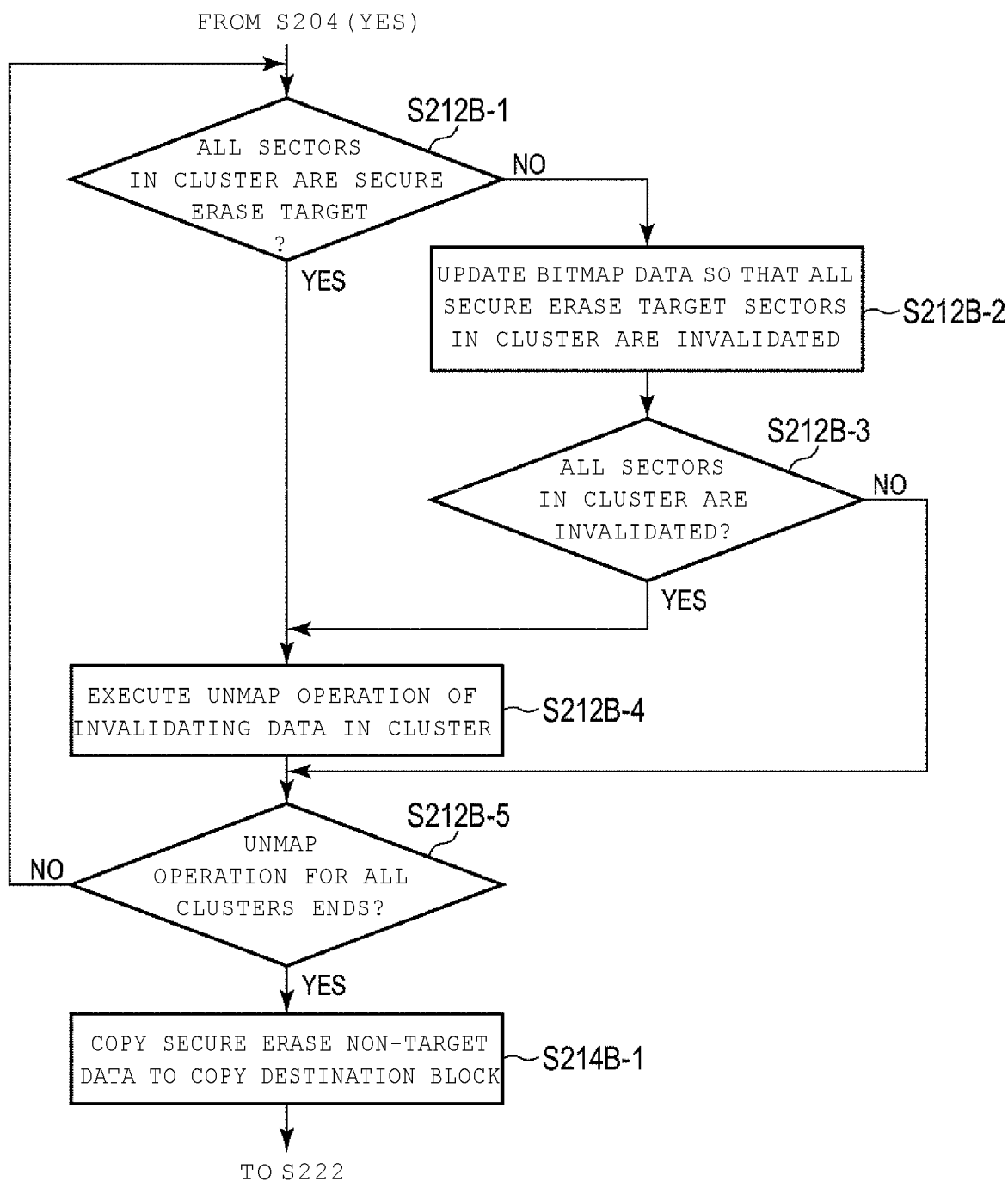
FIG. 13C is a flowchart illustrating another procedure of an unmap operation and a garbage collection operation executed in a physical secure erase operation executed in a memory system according to a third embodiment.

A procedure of the unmap operation (step S212) and the GC operation (step S214) differs according to a relationship between the sector size and the cluster size. FIG. 13B is a flowchart illustrating a procedure of an unmap operation and a GC operation when the sector size is equal to the cluster size. In this case, a single secure erase target sector corresponds to just one cluster. FIG. 13C is a flowchart illustrating a procedure of an unmap operation and a GC operation when the sector size is smaller than the cluster size. In this case, at least one secure erase target sector can be in a part of a cluster that stores valid data.

As illustrated in FIG. 13B, when the sector size is equal to the cluster size, the unmap unit 24*a* performs an unmap operation of invalidating data associated respectively with all secure erase target LBAs specified by the host 2 (step S212A). The unmap unit 24*a* deletes a physical address from each of the entries of the L2P table 37 corresponding to all LBAs included in the second specific command. Alternatively, the unmap unit 24*a* stores NULL values in these entries. Due to this unmap operation, all clusters of the L2P table 37 corresponding to the secure erase target LBAs are invalidated. As a result, data corresponding to all secure erase target LBAs becomes invalid data.

The GC unit 24*b* selects at least all active blocks storing invalid data of the secure erase target LBAs as GC target blocks (i.e., copy source blocks). Alternatively, when the GC operation is implemented, the GC unit 24*b* selects at least all active blocks that store invalid data as the copy source blocks regardless of whether the invalid data is invalid data associated with the secure erase target LBAs.

The GC unit 24*b* may save a block identifier of each active block selected as the copy source block in the secure erase target block list 34.

The GC unit 24*b* freely selects any one of free blocks. The GC unit 24*b* performs block erase on the selected free block. The GC unit 24*b* allocates the block-erased free block as a copy destination block.

The GC unit 24*b* copies valid data among data excluding secure erase target data, i.e., valid data of a secure erase non-target LBA from the copy source block to the copy destination block (step S214A).

The GC unit 24*b* updates the L2P table 37 to map each LBA of the copied valid data to each copy destination physical address.

A procedure of an unmap operation and a GC operation when the sector size is smaller than the cluster size will be described with reference to FIG. 13C. A description of the same procedure as the procedure of the unmap operation and the GC operation described with reference to FIG. 13B will be omitted.

When the sector size is smaller than the cluster size, bitmap data indicating whether data of each sector in a cluster is valid or invalid is stored in, for example, the L2P table 37 as described above.

The unmap unit 24*a* selects a cluster including at least one secure erase target sector as a target of an unmap operation.

When all sectors in the cluster are a secure erase target, i.e., when all data in the cluster is a secure erase target ("YES" in step S212B-1), the unmap unit 24*a* executes an unmap operation of invalidating the data in this cluster (step S212B-4).

When all sectors in the cluster are not a secure erase target ("NO" in step S212B-1), the unmap unit 24*a* updates bitmap data so that all secure erase target sectors in the cluster are invalidated (step S212B-2).

The unmap unit 24*a* examines whether all of the sectors in the cluster are invalidated by this invalidation (step S212B-3).

When it is determined that all of the sectors in the cluster become invalid sectors ("YES" in step S212B-3), the unmap unit 24*a* executes an unmap operation of invalidating the data in this cluster (step S212B-4).

When it is determined that all of the sectors in the cluster are not invalid sectors ("NO" in step S212B-3), the processing for this cluster by the unmap unit 24*a* ends.

The unmap unit 24*a* determines whether the unmap operation for all unmap operation target clusters is completed (step S212B-5).

When it is determined that the unmap operation for all of the clusters is not completed ("NO" in step S212B-5), the unmap unit 24*a* performs determination of step 212B-1 for a next cluster.

When it is determined that the unmap operation for all of the clusters is completed ("YES" in step S212B-5), the GC unit 24*b* copies all of the clusters including valid data in the active block (i.e., secure erase non-target data) from the copy source block to the copy destination block (step S214B-1).

In step S214B-1, when there is an invalidated sector in the cluster, the GC unit 24*b* changes data in that sector to an appropriate value and then copies the data to the copy destination block. The appropriate value is, for example, all zero or all 1, random data or combinations thereof.

The GC unit 24*b* updates entries of the L2P table 37 to associate an LBA of the copied data with a physical address of the previous copied cluster.

Referring back to the description of FIG. 13A, after executing the GC operation (step S214), the GC unit 24*b* determines whether the end condition of the GC operation is satisfied (step S222), as in the first embodiment. The end condition may be that a block storing invalid data of the secure erase target LBA no longer exists from the active block group.

The GC unit 24*b* continues to execute the GC operation until the block storing invalid data of the secure erase target LBA disappears from the active block group (step S214 and "NO" in step S222).

When it is determined that the end condition of the garbage collection operation is satisfied ("YES" in step S222), the GC unit 24*b* ends the GC operation. At this point, there is no possibility that invalid data of the secure erase target LBA may exist other than free blocks.

When at least all active blocks storing invalid data are selected as a GC target blocks regardless of whether the invalid data is invalid data of the secure erase target LBA, the end condition of the GC operation may be that a block storing invalid data disappears from the active block group regardless of whether the invalid data is invalid data of the secure erase target LBA. However, since this reduces the efficiency of the GC operation, this end condition may be adopted when the ratio of invalid data to valid data is large in each of all active blocks.

After determining the end condition of the GC operation (step S222), the secure erase unit 24c performs at least a block erase operation on each free block in which invalid data of the secure erase target LBA is stored (step S224). Thus, all invalid data in the secure erase target LBA is securely erased by block erase.

In step S224, the secure erase unit 24c may perform block erase on each free block in which invalid data of the secure erase target LBA is stored, and further, may write a specific data pattern to each free block as in the first embodiment. Thus, all invalid data of the secure erase target LBA is securely erased by overwrite.

The secure erase unit 24c may perform block erase on all free blocks regardless of whether the free blocks store the invalid data of the secure erase target LBA. Thus, a process of performing at least block erase on each free block in which invalid data of the secure erase target LBA is stored (step S224) may be easily performed.

Alternatively, in order to reduce the number of blocks for which a block erase is performed, the secure erase unit 24c may execute a process of specifying one or more free blocks in which invalid data of the secure erase target LBA is stored to perform block erase only on these one or more free blocks.

In both the former and the latter, at least one or more free blocks in which invalid data of the secure erase target LBA is stored may be a secure erase target.

When the processing of step S224 is completed, the erase controller 24 notifies the host 2 of the completion of the second specific command by transmitting a response indicating the completion of the second specific command to the host 2 (step S226).

The handling of an I/O command when the second specific command requesting secure erase of data in a specific LBA is received is the same as that of the first embodiment, and thus a description thereof will be omitted.

As described above, according to the third embodiment, data of one or more specific LBAs may be securely erased by a physical secure erase method. Further, when a copy source block includes a cluster that stores valid data and has a secure erase target sector existing in a part thereof, the controller 4 changes data of a secure erase target sector to a data pattern such as all 1 or all zero when copying all data of this cluster to a copy destination block. Thus, even when there is a cluster in which a secure erase target sector and a secure erase non-target valid sector coexist, it is possible to correctly copy data of the secure erase non-target valid sector while ensuring the safety of a physical secure erase operation.

Fourth Embodiment

Next, a fourth embodiment will be described. A configuration of an SSD according to the fourth embodiment is the same as the configuration of the SSD 3 according to the first embodiment illustrated in FIG. 1. The fourth embodiment is the same as the third embodiment in that secure erase is performed on data of a specific LBA, but processing related to an unmap operation is different from that of the third embodiment. In the third embodiment, the controller 4 performs an unmap operation before a GC operation, whereas in the fourth embodiment, the controller 4 performs an unmap operation during execution of a GC operation.

Figure 14A:
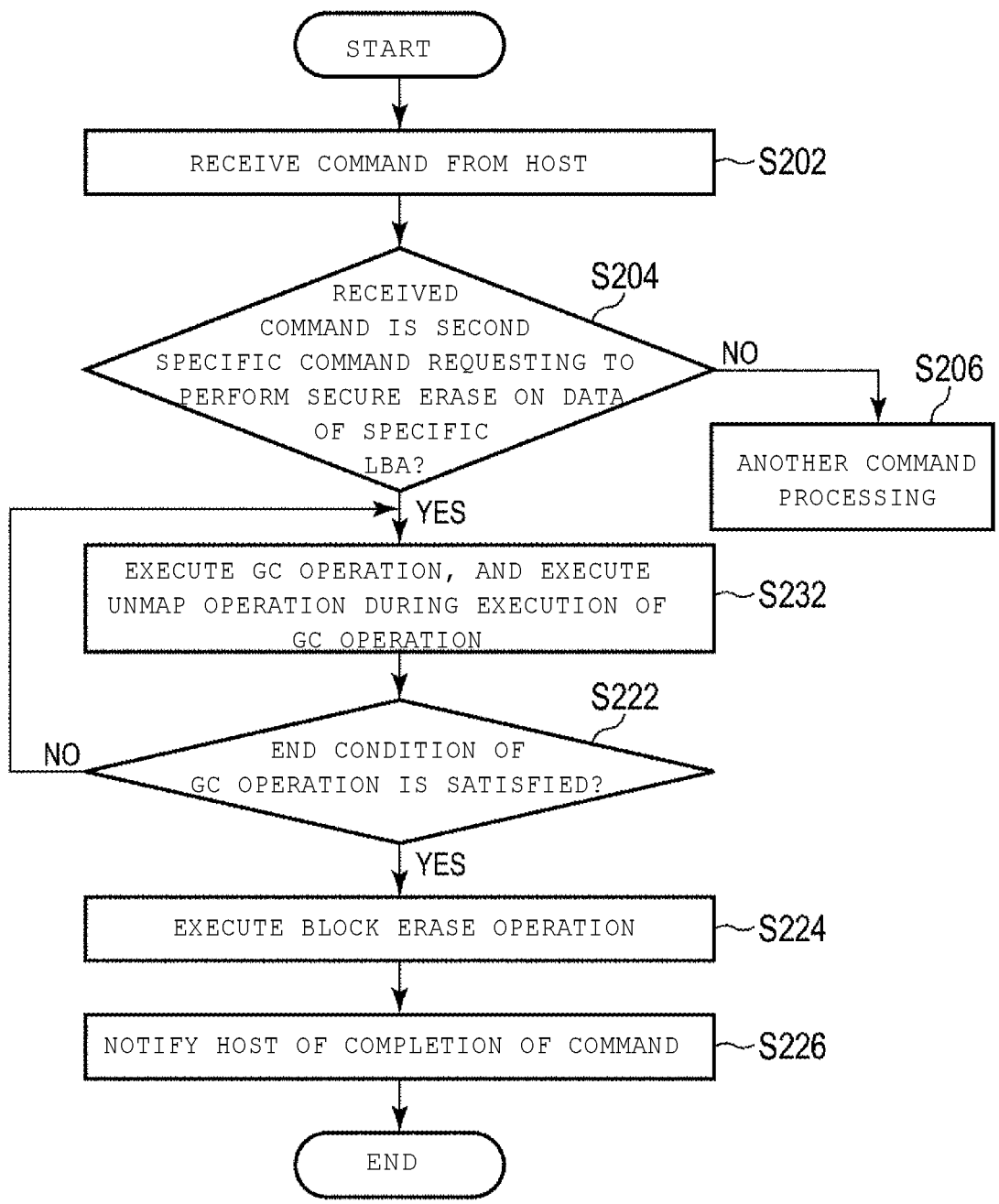
FIG. 14A is a flowchart illustrating a procedure of a physical secure erase operation executed in a memory system according to a fourth embodiment.

FIG. 14A is a flowchart illustrating a procedure of a physical secure erase operation executed in the memory system according to the fourth embodiment. The same procedure as the procedure of the physical secure erase operation executed in the memory system according to the third embodiment described with reference to FIG. 13A will be omitted.

When a received command is a second specific command ("YES" in step S204), the GC unit 24b executes a GC operation, and the unmap unit 24a performs an unmap operation during execution of the GC operation (step S232).

Similar to the third embodiment, a procedure of the GC operation and the unmap operation differs (step S232) according to a relationship between the sector size and the cluster size.

Figure 14B:
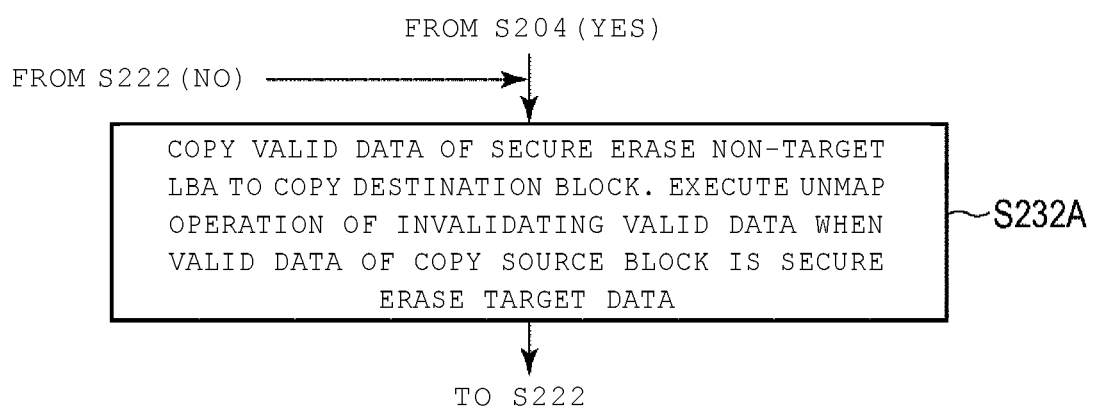
FIG. 14B is a flowchart illustrating a procedure of an unmap operation and a garbage collection operation executed in a physical secure erase operation executed in a memory system according to a fourth embodiment.

FIG. 14B is a flowchart illustrating a procedure of a GC operation and an unmap operation when the sector size is equal to the cluster size. In this case, one secure erase target sector corresponds to one cluster.

In step S232A, the GC unit 24b selects an active block that stores at least data of a secure erase target LBA and valid data of a secure erase non-target LBA, as a GC target block (i.e., a copy source block), regardless of whether the data of the secure erase target LBA is valid data or invalid data. Alternatively, when the GC operation is easily implemented, the GC unit 24b selects all active blocks that store invalid data as copy source blocks regardless of whether the invalid data is data of the secure erase target LBA.

In step S232A, the GC unit 24b copies the valid data of the secure erase non-target LBA from the copy source block to a copy destination block. When the valid data of the secure erase target LBA is stored in the copy source block, the unmap unit 24a performs an unmap operation of invalidating the valid data stored in the copy source block. Thus, the valid data of the secure erase target LBA stored in the copy source block is invalidated. When the valid data of the secure erase non-target LBA stored in the copy source block is copied to the copy destination block, and an unmap operation of invalidating the valid data of the secure erase target LBA stored in the copy source block is also performed, the copy source block becomes a free block. Thus, the data of the secure erase target LBA does not exist other than free blocks. In other words, the data (invalid data) of the secure erase target LBA exists only in certain free blocks.

Figure 14C:
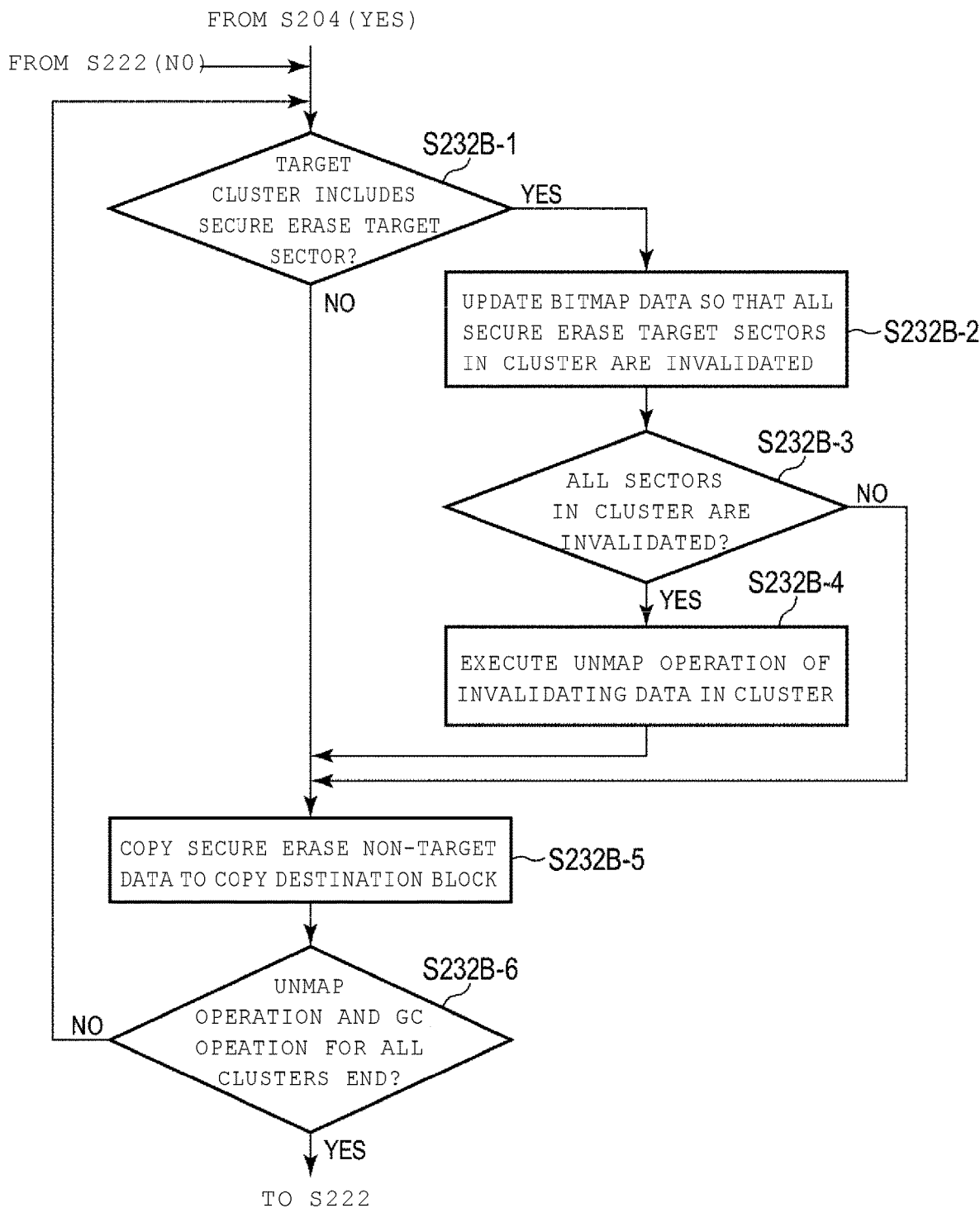
FIG. 14C is a flowchart illustrating another procedure of an unmap operation and a garbage collection operation executed in a physical secure erase operation executed in a memory system according to a fourth embodiment.

FIG. 14C is a flowchart illustrating a procedure of a GC operation and an unmap operation when the sector size is smaller than the cluster size. In this case, bitmap data indicating whether data of each sector in a cluster is valid or invalid is stored in, for example, the L2P table 37 as described above.

The unmap unit 24a and the GC unit 24b select a cluster including at least one sector storing valid data as a target of an unmap operation and a GC operation.

When the cluster as a processing target contains at least one secure erase target sector ("YES" in step S232B-1), the unmap unit 24a updates bitmap data so that all secure erase target sectors in the cluster are invalidated (step S232B-2).

The unmap unit 24a examines whether all of the sectors in the cluster are invalidated by this invalidation (step S232B-3).

When it is determined that all of the sectors in the cluster are invalidated ("YES" in step S232B-3), the unmap unit 24a executes an unmap operation of invalidating data in the cluster (step S232B-4).

After step S232B-4, or when it is determined that all of the sectors in the cluster are not invalidated (i.e., when the cluster stores secure erase non-target valid data ("NO" in step S232B-3)) or when a processing target cluster does not include a secure erase target sector ("NO" in step S232B-1), the GC unit 24b copies valid data in the cluster (i.e., secure erase non-target data) from a copy source block to a copy destination block (step S232B-5). At this time, the GC unit 24b may replace data of the invalidated sectors in the cluster with an appropriate value as in the third embodiment. In step S232B-5, when all of the sectors in the cluster are valid, the GC unit 24b copies data of all of the sectors to the copy destination block, and updates the L2P table 37 to update a copy source cluster address to the copied destination cluster address.

The GC unit 24b determines whether the unmap operation and the GC operation are completed for all clusters including the sectors storing valid data (step S232B-6).

When it is determined that the unmap operation and the GC operation for all of the clusters are not completed ("NO" in step S232B-6), the GC unit 24b performs determination of step S232B-1 for a next cluster.

When it is determined that the unmap operation and the GC operation for all of the clusters are completed ("YES" in step S232B-6), the processing by the GC unit 24b proceeds to step S222.

Finally, all valid data is copied to the copy destination block, and the copy source block becomes a free block. Thus, data of the secure erase target LBA does not exist other than free blocks. In other words, the data (invalid data) of the secure erase target LBA exists only in certain free blocks.

Referring back to the description of FIG. 14A, after execution of the GC operation (step S232), determination of the end condition of the GC operation (step S222), execution of a block erase operation (step S224), and notification of the completion of the command to the host 2 (step S226) are performed as in the third embodiment.

Since the handling of an I/O command when the second specific command is executed is the same as that of the third embodiment, additional description thereof will be omitted.

In the fourth embodiment, substantially the same effects as in the third embodiment may be obtained.

Fifth Embodiment

Next, a fifth embodiment will be described. A configuration of an SSD according to the fifth embodiment is the same as the configuration of the SSD 3 according to the first embodiment illustrated in FIG. 1. A physical secure erase operation of the fifth embodiment performs physical secure erase of old data in response to a specific write command that requests write of data to a logical area identified by a certain logical area identifier and secure erase of old data associated with this logical area identifier. A logical address such as an LBA or a key of a key-value store may be used as the logical area identifier. That is, the physical secure erase operation of the fifth embodiment may also be applied to the key-value store. In a case of the key-value store, the physical secure erase operation of the fifth embodiment performs a physical secure erase of an old value in response to a specific write command that requests write of a value (data) corresponding to a certain key and secure erase of the old value (old data) associated with this key.

Hereinafter, a case where an LBA is used as a logical area identifier will be described.

A specific write command may include, for example, an LBA (start LBA), the size of write data (the number of sectors), a target namespace identifier, and a data pointer indicating a position within the memory of the host 2 where this write data is stored (buffer address), in the same manner as a normal write command.

The controller 4 of the SSD according to the fifth embodiment writes write data associated with the specific write command to the NAND type flash memory 5 and updates the L2P table 37 to associate a physical address to which the write data is written with an LBA of the write data. Then, the controller 4 automatically executes a physical secure erase operation on old data (invalid data) associated with the LBA.

There is a possibility that the old data associated with this LBA may remain in a plurality of blocks due to a GC operation. Further, even when a specific write command specifying this LBA is received after a normal write command specifying a certain LBA is received multiple times, there is a possibility that the old data associated with this LBA may remain in a plurality of blocks.

Therefore, the controller 4 performs a GC operation of selecting all active blocks storing the old data associated with this LBA as GC target blocks (copy source blocks), and copying valid data stored in these GC target blocks to one or more copy destination blocks. Thus, the old data does not exist in any block other than free blocks.

After executing the GC operation, the controller 4 performs at least block erase on each free block storing the old data among the free blocks managed by the free block list 35. This makes it possible to securely erase the old data. In this case, the controller 4 may perform block erase on all the free blocks managed by the free block list 35 after executing the GC operation. Alternatively, in order to reduce the number of blocks on which block erase is performed, the controller 4 may execute a process of identifying one or more free blocks in which old data is stored, and may perform the block erase on only these identified one or more free blocks.

FIG. 15 is a flowchart illustrating a procedure of a physical secure erase operation executed in the memory system according to the fifth embodiment.

When the controller 4 receives a command from the host 2 (step S302), the CPU 12 determines whether the received command is a specific write command (step S304).

When it is determined that the received command is not a specific write command ("NO" in step S304), the CPU 12 executes processing according to the received command (step S306).

When it is determined that the received command is a specific write command ("YES" in step S304), the write controller 22 writes write data (update data) associated with the specific write command to the NAND type flash memory 5, and updates the L2P table 37.

The GC unit 24b executes a GC operation (step S314). In step S314, the GC unit 24b may select all active blocks storing old data associated with an LBA specified by the specific write command as GC target blocks, i.e., copy source blocks.

The GC unit 24b freely selects one free block from the free blocks. The GC unit 24b performs block erase on the selected free block. The GC unit 24*b* allocates the block-erased free block as a copy destination block.

The GC unit 24*b* copies valid data from the copy source block to the copy destination block.

After executing the GC operation (step S314), the GC unit 24*b* determines whether the end condition of the GC operation is satisfied (step S322). The end condition may be that a block storing old data associated with the LBA specified by the specific write command no longer exists from the active block group.

The GC unit 24*b* continues to execute the GC operation until the block storing the old data disappears from the active block group ("NO" in step S322, step S314).

When it is determined that the end condition of the garbage collection operation is satisfied ("YES" in step S322), the GC unit 24*b* ends the GC operation. At this point, there is no possibility that the old data may exist other than free blocks.

After that, the secure erase unit 24*c* performs at least block erase on the free block in which at least the old data exists (step S324). Thus, the old data is securely erased by block erase.

When the processing of step S324 is completed, the erase controller 24 notifies the host 2 of the completion of the specific write command by transmitting a response indicating the completion of the specific write command to the host 2 (step S326).

Since it takes a long time to execute a specific write command, the erase controller 24 may notify the host 2 of the completion of the command when the specific write command is received. That is, the erase controller 24 may execute the processing of step S326 immediately before step S312. When the processing of a specific write command is not completed normally, the controller 4 may notify the host 2 of that the processing of the specific command was not completed normally by using an abnormality notification mechanism defined by the command interface standard, or may record the occurrence of an abnormality in a log defined by the command interface standard.

(Modifications)

A specific write command may be used which requests write of data to a logical area identified by a certain logical area identifier and indicates that the data written to this logical area will later become secure erase target data. In this case, in response to receiving this specific write command from the host 2, the controller 4 executes a write operation of writing write data to this logical area, and stores log information indicating this logical area is a secure erase target area, for example, in the DRAM 6. Whenever this specific write command is received from the host 2, the controller 4 executes a write operation and an operation of storing log information. When a specific secure erase command requesting secure erase is eventually received from the host 2, the controller 4 identifies the secure erase target areas by referring to the log information. Then, the controller 4 executes a physical secure erase operation of securely erasing the data stored in these secure erase target areas. By collectively executing the physical secure erase operations on the plurality of secure erase target areas in this way, the required number of GC operations may be reduced. As a result, the influence of an increase in the number of rewrites of the NAND type flash memory 5 on the life of the SSD 3 may be reduced, and the processing time of a specific write command may be reduced.

As described above, according to the fifth embodiment, old data associated with an LBA of new write data may be securely erased by a physical secure erase method.

Sixth Embodiment

Next, a sixth embodiment will be described. A configuration of an SSD according to the sixth embodiment is substantially the same as the configuration of the SSD 3 according to the first embodiment illustrated in FIG. 1. A physical secure erase operation of the sixth embodiment can be considered a modification of the third embodiment. In the third embodiment, valid data and invalid data associated with (or previously associated with) a specific LBA are securely erased. In the sixth embodiment, only the invalid data among data stored in association with a logical area identified by a logical area identifier is securely erased, and the valid data stored in association with the logical area identified by the logical area identifier is not erased.

In the following, a case where an LBA is used as a logical area identifier indicating a secure erase target logical area will be described as an example.

In the sixth embodiment, the second specific command of the third embodiment is changed to a third specific command that treats only the invalid data of one or more specific LBAs as the secure erase target data without treating the valid data of the one or more specific LBAs as the secure erase target data.

The sixth embodiment is useful when it is desired to securely erase only old data (invalid data) that was written in the past to one or more specified specific LBAs without erasing the current data (valid data) that may be read by a read operation.

Figure 16:
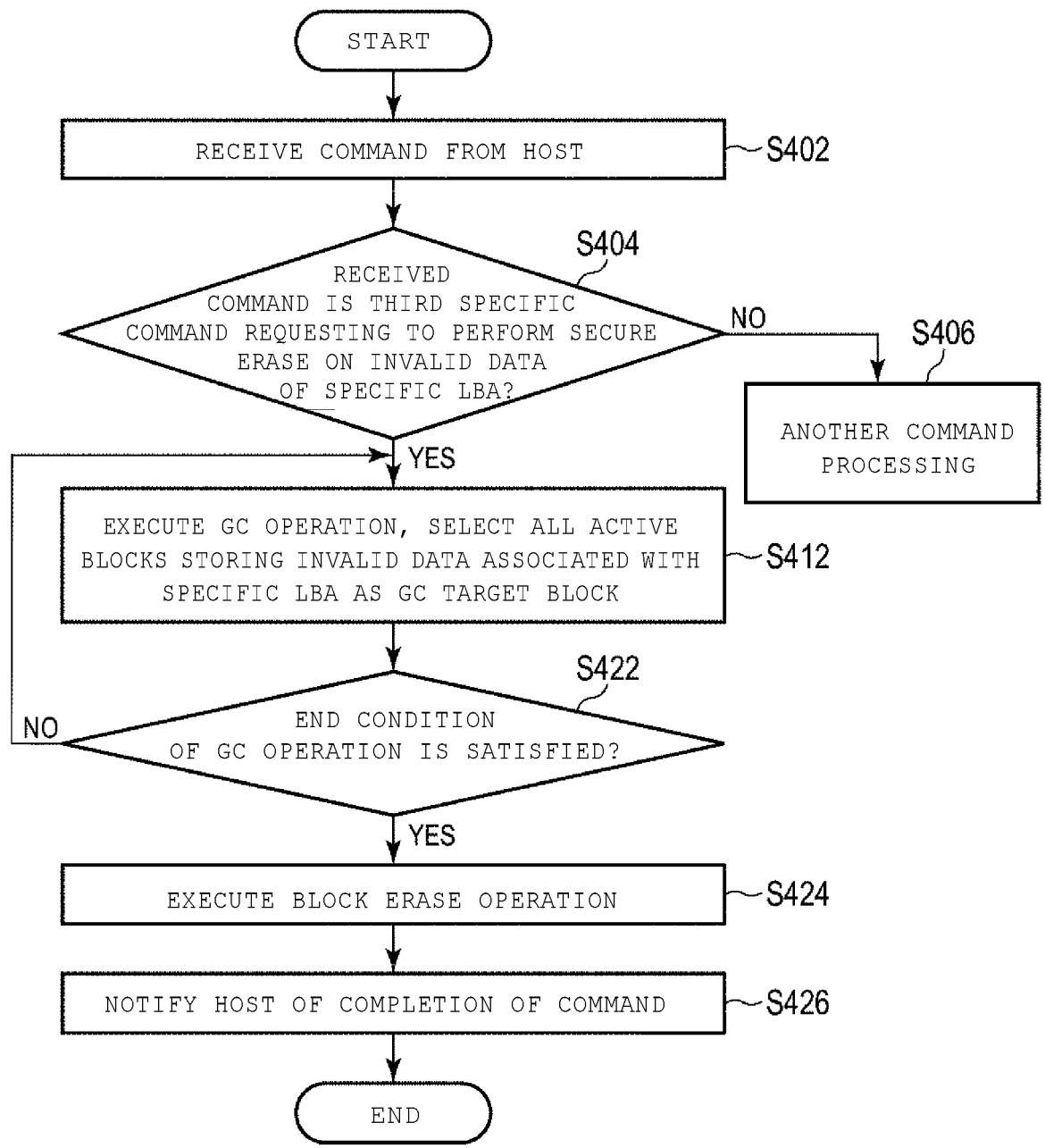
FIG. 16 is a flowchart illustrating a procedure of a physical secure erase operation according to a sixth embodiment.

FIG. 16 is a flowchart illustrating a procedure of a physical secure erase operation executed in the memory system according to the sixth embodiment. The procedure for the physical secure erase operation executed in the memory system according to the sixth embodiment is similar in some aspects to those described with reference to FIG. 13A. Description of such similar aspects will not be repeated.

When the controller 4 receives a command from the host 2 (step S402), the CPU 12 determines whether the received command is a third specific command (step S404).

When it is determined that the received command is not the third specific command ("NO" in step S404), the CPU 12 executes processing according to the received command (step S406).

When it is determined that the received command is the third specific command ("YES" in step S404), the GC unit 24*b* executes a GC operation (step S412).

The GC unit 24*b* selects at least all active blocks that store invalid data associated with one or more specific LBAs specified by the third specific command as GC target blocks (i.e., copy source blocks).

The GC unit 24*b* copies valid data from a copy source block to a copy destination block.

After executing the GC operation, the GC unit 24*b* determines whether the end condition of the GC operation has been satisfied (step S422). The end condition may be that each block storing the invalid data associated with the one or more specified specific LBAs no longer exists in the active block group.

The GC unit 24*b* continues to execute the GC operation until each block storing the invalid data associated with the specified one or more specific LBAs is removed from the active block group (step S412 and "NO" in step S422).

When it is determined that the end condition of the garbage collection operation is satisfied ("YES" in step S422), the GC unit 24*b* ends the GC operation. At this point, there is no possibility that invalid data associated with the one or more specified specific LBAs exists in any blocks other than free blocks.

After determining the end condition of the GC operation (step S422), the secure erase unit 24c performs at least a block erase on the one or more free blocks in which invalid data associated with the specified specific one or more LBAs is stored (step S424). Thus, invalid data of a secure erase target sector is securely erased by a block erase.

The secure erase unit 24c may perform a block erase on all of the free blocks managed by the free block list 35 after executing the GC operation. Alternatively, in order to reduce the number of blocks on which a block erase is performed, the secure erase unit 24c may execute a process of specifying one or more free blocks in which the invalid data associated with the one or more specified specific LBAs is stored, and may perform the block erase only on these one or more specified free blocks.

When the processing of step S424 is completed, the erase controller 24 notifies the host 2 of the completion of the third specific command by transmitting a response indicating the completion of the third specific command to the host 2 (step S426).

As described above, according to the sixth embodiment, invalid data associated with one or more specified specific LBAs may be securely erased by a physical secure erase method. That is, in the sixth embodiment, invalid data associated with one or more specified specific LBAs can be a secure erase target, but also in the secure erase operation of the sixth embodiment, the invalid data among data in a specified specific namespace can be a secure erase target.

In this case, in response to receiving a fourth specific command requesting secure erase only for the invalid data in a specific namespace from the host 2, the controller 4 executes a physical secure erase operation of performing secure erase only on the invalid data among data in the specified specific namespace.

In the above-described embodiments, a description of the handling of blocks that are broken or that have exceeded the specified number of erases was omitted. Data contained such blocks as these broken or aged blocks may be invalidated and handled as defective blocks. Since the data contained in these blocks is invalid data, these blocks may collectively be regarded as a single free block and may also be block erase targets at the time of a secure erase. Alternatively, a block erase may be performed when these blocks are initially made into (designated as) defective blocks.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
   a non-volatile memory including a plurality of blocks, each block being a minimum unit of a data erasing operation; and
   a controller electrically connected to the non-volatile memory and configured to:
   execute, in response to a first command from a host requesting a secure erase of secure erase target data stored in a first logical area identified by a first logical area identifier, a copy operation copying valid data other than any secure erase target data from one or more first blocks of the plurality of blocks in which the secure erase target data is stored to one or more copy destination blocks of the plurality of blocks,
   execute the data erasing operation on the one or more first blocks after the copy operation,
   execute, in response to the first command, the data erasing operation on a free block from among free blocks in the plurality of blocks storing no valid data before a start of the copy operation and not used as one of the copy destination blocks when the free block was storing invalid data included among the secure erase target data when the first command was received; and
   execute, in response to the first command and during execution of the copy operation, an unmap operation invalidating the secure erase target data and any valid data among the secure erase target data stored in the one or more first blocks.

2. The memory system according to claim 1, wherein the secure erase target data includes valid data.

3. The memory system according to claim 1, wherein the secure erase target data includes only invalid data.

4. The memory system according to claim 1, wherein the controller is configured to manage a plurality of namespaces identified respectively by a plurality of namespace identifiers, and
   the first logical area identifier is a namespace identifier that identifies a secure erase target namespace.

5. The memory system according to claim 1, wherein the first logical area identifier includes one or more logical addresses that identify one or more secure erase target sectors.

6. The memory system according to claim 1, wherein the first logical area identifier includes one or more keys that identify one or more secure erase target values.

7. The memory system according to claim 1, wherein
   the first logical area identifier includes one or more logical addresses that identify one or more secure erase target sectors, and
   the controller is further configured to:
   manage a mapping between each logical address and each physical address of the non-volatile memory in a cluster unit using a logical physical address translation table,
   change data of the secure erase target sectors stored in a first cluster to a first data pattern, the first cluster storing valid data, and the secure erase target sectors being in the first cluster, and
   execute a copy operation copying the first cluster to the one or more copy destination blocks.

8. The memory system according to claim 1, wherein the secure erase target data includes invalid data previously associated with the first logical area identifier.

9. The memory system according to claim 1, wherein the first command designates the first logical area identifier.

10. The memory system according to claim 1, wherein the first logical area identifier is designated by a command from the host other than the first command.

11. A control method for controlling a non-volatile memory including a plurality of blocks, each block being a minimum unit of a data erasing operation, the control method comprising:

executing, in response to a first command from a host requesting a secure erase of secure erase target data stored in a first logical area identified by a first logical area identifier, a copy operation copying valid data other than any secure erase target data from one or more first blocks of the plurality of blocks in which the secure erase target data is stored to one or more copy destination blocks of the plurality of blocks;

executing the data erasing operation on the one or more first blocks after the copy operation;

executing, in response to the first command, the data erasing operation on a free block from among free blocks in the plurality of blocks storing no valid data before a start of the copy operation and not used as one of the copy destination blocks when the free block was storing invalid data included among the secure erase target data when the first command was received; and executing, in response to the first command and during execution of the copy operation, an unmap operation invalidating the secure erase target data and any valid data among the secure erase target data stored in the one or more first blocks.

12. The control method according to claim 11, wherein the secure erase target data includes invalid data previously associated with the first logical area identifier.

13. The control method according to claim 11, wherein the first command designates the first logical area identifier.

14. The control method according to claim 11, wherein the first logical area identifier is designated by a command from the host other than the first command.

* * * * *